US012581507B2

(12) United States Patent (10) Patent No.: US 12,581,507 B2
Qiao et al. (45) Date of Patent: Mar. 17, 2026

(54) SATELLITE COMMUNICATION METHOD AND APPARATUS

(71) Applicant: HUAWEI TECHNOLOGIES CO., LTD., Shenzhen (CN)

(72) Inventors: Yunfei Qiao, Hangzhou (CN); Ying Chen, Hangzhou (CN); Rong Li, Boulogne Billancourt (FR)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 322 days.

(21) Appl. No.: 18/502,608

(22) Filed: Nov. 6, 2023

(65) Prior Publication Data

US 2024/0073926 A1     Feb. 29, 2024

Related U.S. Application Data

(63) Continuation of application No. PCT/CN2022/085738, filed on Apr. 8, 2022.

(30) Foreign Application Priority Data

May 7, 2021     (CN) ......................... 202110496068.3

(51) Int. Cl.
| | |
|---|---|
| *H04W 72/232* | (2023.01) |
| *H04B 7/08* | (2006.01) |
| *H04W 72/044* | (2023.01) |
| *H04W 72/231* | (2023.01) |
| *H04W 84/06* | (2009.01) |

(52) U.S. Cl.
CPC .......... *H04W 72/232* (2023.01); *H04B 7/088* (2013.01); *H04W 72/046* (2013.01); *H04W 72/231* (2023.01); *H04W 84/06* (2013.01)

(58) Field of Classification Search
CPC ............. H04W 72/232; H04W 72/231; H04W 72/046; H04B 7/088
See application file for complete search history.

(56) References Cited

U.S. PATENT DOCUMENTS

| | | | |
|---|---|---|---|
| 2016/0323032 A1 | 11/2016 | Ulupinar et al. | |
| 2016/0323800 A1* | 11/2016 | Ulupinar .............. | H04B 7/1851 |
| 2020/0059290 A1* | 2/2020 | Pan .................... | H04B 7/06952 |
| 2020/0177265 A1* | 6/2020 | Guan .................... | H04W 76/11 |
| 2021/0160964 A1* | 5/2021 | Sun ....................... | H04W 76/11 |

OTHER PUBLICATIONS

3GPP TS 38.321 V16.4.0 (Mar. 2021), 3rd Generation Partnership Project; Technical Specification Group Radio Access Network; NR; Medium Access Control (MAC) protocol specification (Release 16); 157 total pages.

* cited by examiner

*Primary Examiner* — David Bilodeau

(74) *Attorney, Agent, or Firm* — Rimon PC

(57) ABSTRACT

A satellite communication method and apparatus are provided, to reduce the signaling overhead of downlink control information delivered by a satellite and that indicates beam switching when a plurality of communication apparatuses need to simultaneously perform a beam switch. In the method, a plurality of communication apparatuses are grouped based on geographical locations of the plurality of communication apparatuses, and a group identifier of a device group to which a communication apparatus belongs and an identifier of a beam to be switched to during the beam switch are sent, in a broadcast manner, to the communication apparatus that belongs to the same device group.

20 Claims, 5 Drawing Sheets

700

SATELLITE COMMUNICATION METHOD AND APPARATUS

CROSS-REFERENCE TO RELATED APPLICATIONS

This application is a continuation of International Patent Application No. PCT/CN2022/085738, filed on Apr. 8, 2022, which claims priority to Chinese Patent Application No. 202110496068.3, filed on May 7, 2021. The disclosures of the aforementioned applications are hereby incorporated by reference in their entireties.

TECHNICAL FIELD

This application relates to the communication field, and more specifically, to a satellite communication method and apparatus.

BACKGROUND

Current terrestrial mobile communication networks have limited coverage capabilities, and cannot meet the requirement that people be able to obtain information anytime and anywhere. In addition, providing ultra-wide coverage based on the current coverage mode of a base station poses great challenges in terms of costs and feasibility in situations, for example, in remote areas, such as in deserts, in oceans, and in the air. Compared with conventional mobile communication systems, satellite communication provides a wider coverage area and supports asymmetric transmission links. Communication costs of the satellite communication are independent of the transmission distance. The satellite communication can overcome natural geographical obstacles such as oceans, deserts, and mountains. To overcome shortcomings of conventional terrestrial mobile communication systems, satellite communication can be used as an effective supplement to the conventional communication systems. For example, a non-terrestrial network (NTN) introduced into a 5G system provides seamless coverage for a terminal device by deploying a base station, or some base station functions, on a high-altitude platform or a satellite, and the high-altitude platform or the satellite is less affected by natural disasters. This can improve the reliability of the 5G system. Currently, when a terminal device in a satellite communication system performs beam switching, when a plurality of terminal devices need to perform simultaneous switching, the satellite needs to consume high signaling overheads of downlink control information (DCI) for indicating to the plurality of terminal devices to perform beam switching. Therefore, how to reduce signaling overheads for indicating to the plurality of terminal devices to simultaneously perform beam switching is an urgent problem to be resolved.

SUMMARY

This application provides a satellite communication method and apparatus, to reduce the signaling overhead of DCI delivered by a satellite and that indicates beam switching when a plurality of communication apparatuses need to perform simultaneous beam switching.

According to a first aspect, this application provides a communication method for a first communication apparatus. The method includes: A first communication apparatus sends first information, where the first information indicates a geographical location of the first communication apparatus; the first communication apparatus receives second information, where the second information indicates that the first communication apparatus belongs to a first device group, the first device group corresponds to the geographical location of the first communication apparatus, and the second information includes a group identifier of the first device group; the first communication apparatus receives third information, where the third information includes a group identifier of a second device group and an identifier of a first beam, and the third information indicates a communication apparatus in a device group indicated by the group identifier of the second device group to switch to the first beam; and if the group identifier of the first device group is the same as the group identifier of the second device group, the first communication apparatus switches to the first beam.

In this manner, the first communication apparatus may report the geographical location of the first communication apparatus (for example, a terminal device) at an interval of a period of time, and a second communication apparatus (for example, a satellite) may update, in real time, a group identifier of a device group to which the first communication apparatus belongs.

In this manner, the plurality of communication apparatuses are grouped based on geographical location information, and the second communication apparatus is enabled to indicate, based on a device group, communication apparatuses that belong to a same device group to perform same beam switch, to reduce the signaling overhead for indicating beam switching of the plurality of communication apparatuses.

In a possible implementation, that the first communication apparatus receives third information includes: The first communication apparatus receives the third information on a first resource, where the first resource is indicated by fourth information, and a resource occupied for transmission of the fourth information is determined based on at least one of the following manners: semi-static allocation, or a calculation based on the group identifier of the first device group.

In this way, a time domain and frequency domain resource occupied for the transmission of the fourth information may be semi-statically allocated.

In this way, the resource occupied for the transmission of the fourth information may be flexibly allocated by the second communication apparatus to communication apparatuses in different device groups.

In a possible implementation, the third information further includes at least one of the following parameters: a time at which the communication apparatus in the second device group starts to perform beam switching and a first time offset, where the first time offset is a time interval between a time at which the communication apparatus in the second device group receives fifth information and a time at which the communication apparatus in the second device group receives the fourth information, and the fifth information is updated information of the fourth information.

In this way, the first time offset may also be understood as a time indicating that the communication apparatus in the second device group reads the fifth information on a semi-statically allocated resource. The fifth information being updated information of the fourth information may be understood as information that corresponds to beam switching performed by the communication apparatus in the second device group next time and that has a same function as the fourth information.

In this way, the time at which the communication apparatus in the second device group performs beam switching and the time at which the fifth information is read can be more accurately indicated.

In a possible implementation, the fourth information and the fifth information are scrambled by using a cell-level or beam-level radio network temporary identifier (RNTI).

In this way, the communication apparatus in the second device group is enabled to more accurately recognize the fourth information and the fifth information based on information scrambled by using the cell-level or beam-level RNTI. For example, the cell-level or beam-level RNTI may be a currently reserved RNTI.

In a possible implementation, the third information is included in downlink control information DCI.

In this way, the signaling overhead of DCI for indicating the beam switching of the plurality of communication apparatuses by the second communication apparatus is reduced.

In a possible implementation, the third information is carried on a first media access control control element (MAC CE), and a type of the third information is indicated by a logical channel identifier LCD value in a first MAC protocol data unit PDU.

In a possible implementation, the first information further indicates a movement state of the first communication apparatus.

In this way, the movement state may include a movement speed and a movement direction.

In this way, the second communication apparatus is enabled to more accurately group a communication apparatus in the movement state.

In a possible implementation, the method further includes: If the group identifier of the first device group is different from the group identifier of the second device group, the first communication apparatus performs no beam switching.

According to a second aspect, this application provides a communication method for a second communication apparatus. The method includes: receiving a plurality of instances of first information, where the plurality of instances of first information are in one-to-one correspondence with a plurality of communication apparatuses, and each instance of first information indicates a geographical location of a corresponding communication apparatus; sending a group identifier of a first device group to which a first communication apparatus belongs, where the first communication apparatus is one of the plurality of communication apparatuses, and the first device group belongs to one of at least one device group determined by grouping, based on the plurality of instances of first information, and the plurality of communication apparatuses; and sending second information, where the second information includes the group identifier of the first device group, and the second information indicates a communication apparatus in the first device group to perform beam switching, to switch to a first beam.

The first communication apparatus may report geographical location information of the first communication apparatus at an interval of a period of time, and the second communication apparatus may update, in real time, a group identifier of a device group to which a communication apparatus belongs.

In this way, the plurality of communication apparatuses are grouped based on the geographical location information, and the second communication apparatus is enabled to indicate, based on the device group, communication apparatuses that belong to a same device group to perform a same beam switching, to reduce the signaling overhead for indicating beam switching of the plurality of communication apparatuses.

In a possible implementation, the second information further includes information about the first beam.

In this way, the information about the first beam may include an identifier of the first beam.

In this way, the second communication apparatus is enabled to more accurately indicate to the communication apparatus in the first device group to perform beam switching based on the information about the first beam.

In a possible implementation, the transceiver module is further configured to: send the second information on a first resource, where the first resource is indicated by third information, and a resource occupied for transmission of the third information is determined based on at least one of the following manners: semi-static allocation, or a calculation based on the group identifier of the first device group.

In this way, the second communication apparatus may perform semi-static allocation for a time domain and frequency domain resource occupied for the transmission of the third information.

In this way, the second communication apparatus may flexibly allocate, to communication apparatuses in different device groups, the resource occupied for the transmission of the third information.

In a possible implementation, the second information further includes at least one of the following parameters: a time at which the communication apparatus in the first device group starts to perform beam switching and a first time offset, where the first time offset is a time interval between a time at which the communication apparatus in the first device group receives fourth information and a time at which the communication apparatus in the first device group receives the third information, and the fourth information is updated information of the third information.

In this way, the first time offset may also be understood as indicating a time at which the communication apparatus in the first device group reads the fourth information on a semi-statically allocated resource. The fourth information being updated information of the third information may be understood as information that corresponds to a beam switch performed by the communication apparatus in the first device group next time and that has a same function as the third information.

In this manner, the time at which the communication apparatus in the first device group performs beam switching and the time at which the fourth information is read can be more accurately indicated.

In a possible implementation, the third information and the fourth information are scrambled by using a cell-level or beam-level radio network temporary identifier (RNTI).

In this manner, the communication apparatus in the first device group is enabled to more accurately recognize the third information and the fourth information based on information scrambled by using the cell-level or beam-level RNTI. It should be understood that the cell-level or beam-level RNTI may be a currently reserved RNTI.

In a possible implementation, the second information is included in downlink control information DCI.

In this way, the signaling overhead of DCI for indicating the beam switching of the plurality of communication apparatuses by the second communication apparatus are reduced.

In a possible implementation, the second information includes a first list, where the first list includes the group identifier of the first device group and a group identifier of a second device group.

In this way, a communication apparatus in a device group is enabled to determine, based on whether the first list includes an identifier of the device group to which the communication apparatus belongs, whether beam switching needs to be performed.

In a possible implementation, the second information is carried on a first media access control control element (MAC CE), and a type of the second information is indicated by a logical channel identifier LCD value in a first MAC protocol data unit PDU.

In a possible implementation, each instance of first information further indicates a movement state of the corresponding communication apparatus.

In this way, the movement state may include a movement speed and a movement direction.

In this way, the second communication apparatus is enabled to more accurately group a communication apparatus in motion.

According to a third aspect, this application provides a communication method for a second communication apparatus. The method includes: A first communication apparatus sends first information, where the first information indicates a geographical location of the first communication apparatus, and the first information is used by the second communication apparatus to determine information about a candidate switch beam set of the first communication apparatus; receiving the information about the candidate switch beam set; and receiving second information, where the second information indicates to the first communication apparatus to switch to a first beam in the candidate switch beam set, and the first beam is one of the beams supported by the second communication apparatus.

In this way, the candidate switch beam set may be a subset of one switch beam set. In this manner, the candidate switch beam set may be indicated based on the first information, and the second information indicates one first beam from the candidate switch beam set. In this way, one first beam is selected from a larger switch beam set without increasing the signaling overhead of the second information.

In a possible implementation, the second information includes an identifier of the first beam or an index corresponding to the candidate switch beam set, and is included in the first downlink control information DCI.

For example, the first DCI may be scrambled by using a cell-level or beam-level radio network temporary identifier (RNTI), or a frequency domain resource assignment field may be set to all 0s, representing that the first DCI indicates a beam switch.

In this way, the first DCI is reused for indicating to a communication apparatus to perform beam switching. For example, the first DCI may be a DCI that indicates to the first communication apparatus to change from an idle state to a connected state.

In a possible implementation, the first information further indicates a movement state of the first communication apparatus.

In this way, the movement state may include a movement speed and a movement direction.

In this way, the second communication apparatus is enabled to more accurately determine the information about the candidate switch beam set of the first communication apparatus.

In a possible implementation, the information about the candidate switch beam set is carried in a first media access control control element (MAC CE).

According to a fourth aspect, a communication method for a second communication apparatus is provided. The method includes: The second communication apparatus receives first information, where the first information indicates a geographical location of a first communication apparatus; the second communication apparatus sends information about a candidate switch beam set, where the information about the candidate switch beam set is determined based on the first information; and sending second information, where the second information indicates to the first communication apparatus to switch to a first beam in the candidate switch beam set, and the first beam is one of the beams supported by the second communication apparatus.

In this way, the candidate switch beam set may be a subset of one switch beam set. In this manner, the candidate switch beam set may be indicated based on the first information, and the second information indicates one first beam from the candidate switch beam set. In this way, one first beam is selected from a larger switch beam set without increasing the signaling overhead of the second information.

In a possible implementation, the second information includes an identifier of the first beam or an index corresponding to the candidate switch beam set, and is included in first downlink control information DCI.

For example, the first DCI may be scrambled by using a cell-level or beam-level radio network temporary identifier (RNTI), or a frequency domain resource assignment field may be set to all 0s, representing that the first DCI indicates a beam switch.

In this manner, the first DCI is reused for indicating to a communication apparatus to perform beam switch. For example, the first DCI may be a DCI that indicates to the communication apparatus to change from an idle state to a connected state.

In a possible implementation, the first information further indicates a movement state of the first communication apparatus.

In this way, the movement state may include a movement speed and a movement direction.

In this way, the second communication apparatus is enabled to more accurately determine the information about the candidate switch beam set of the first communication apparatus.

In a possible implementation, the information about the candidate switch beam set is carried in a first media access control control element (MAC CE).

According to a fifth aspect, a communication apparatus is provided. The communication apparatus functions to implement the exemplary method in the first aspect. A function may be implemented by hardware, or may be implemented by hardware executing corresponding software. The hardware or software includes one or more modules corresponding to the function. In a possible implementation, the communication apparatus includes: A transceiver module configured to send first information, where the first information indicates a geographical location of a first communication apparatus, the transceiver module is further configured to receive second information, where the second information indicates that the first communication apparatus belongs to a first device group, the first device group corresponds to the geographical location of the first communication apparatus, and the second information includes a group identifier of the first device group, and the transceiver module is further configured to receive third information, where the third information includes a group identifier of a second device group and an identifier of a first beam, and the third information indicates to a communication apparatus in a device group indicated by the group identifier of the second device group to switch to the first beam; and a processing module is configured to: if the group identifier of the first device group is the same as the group identifier of the second device group, switch to the first beam.

In this way, the first communication apparatus may report the geographical location of the first communication apparatus at an interval of a period of time, and the second communication apparatus may update, in real time, a group identifier of a device group to which the first communication apparatus belongs.

In this way, a plurality of communication apparatuses are grouped based on geographical location information, and the second communication apparatus is enabled to indicate, based on a device group, communication apparatuses that belong to a same device group to perform a same beam switch, to reduce the signaling overhead for indicating a beam switch of the plurality of communication apparatuses.

In a possible implementation, the first communication apparatus receives the third information on a first resource, where the first resource is indicated by fourth information, and a resource occupied for transmission of the fourth information is determined based on at least one of the following manners: semi-static allocation, or a calculation based on the group identifier of the first device group.

In this way, a time domain and frequency domain resource occupied for the transmission of the fourth information may be semi-statically allocated.

In this way, the resource occupied for the transmission of the fourth information may be flexibly allocated by the second communication apparatus to communication apparatuses in different device groups.

In a possible implementation, the third information further includes at least one of the following parameters: a time at which the communication apparatus in the second device group starts to perform a beam switch and a first time offset, where the first time offset is a time interval between a time at which the communication apparatus in the second device group receives fifth information and a time at which the communication apparatus in the second device group receives the fourth information, and the fifth information is updated information of the fourth information.

In this way, the first time offset may also be understood as time indicating that the communication apparatus in the second device group reads the fifth information on a semi-statically allocated resource. The fifth information being updated information of the fourth information may be understood as information that corresponds to a beam switch performed by the communication apparatus in the second device group next time and that has a same function as the fourth information.

In this way, the time at which the communication apparatus in the second device group performs a beam switch and the time at which the fifth information is read can be more accurately indicated.

In a possible implementation, the fourth information and the fifth information are scrambled by using a cell-level or beam-level radio network temporary identifier (RNTI).

In this way, the communication apparatus in the second device group is enabled to more accurately recognize the fourth information and the fifth information based on information scrambled by using the cell-level or beam-level RNTI. For example, the cell-level or beam-level RNTI may be a currently reserved RNTI.

In a possible implementation, the third information is included in downlink control information DCI.

In this way, the signaling overhead of a DCI for indicating the beam switching of the plurality of communication apparatuses by the second communication apparatus is reduced.

In a possible implementation, the third information is carried on a first media access control control element (MAC CE), and a type of the third information is indicated by a logical channel identifier LCD value in a first MAC protocol data unit PDU.

In a possible implementation, the first information further indicates a movement state.

In this way, the movement state may include a movement speed and a movement direction.

In this way, the second communication apparatus is enabled to more accurately group a communication apparatus in the movement state.

In a possible implementation, the method further includes: If the group identifier of the first device group is different from the group identifier of the second device group, the first communication apparatus performs no beam switching.

According to a sixth aspect, a communication apparatus is provided. The communication apparatus functions to implement the exemplary method in the second aspect. A function may be implemented by hardware, or may be implemented by hardware executing corresponding software. The hardware or software includes one or more modules corresponding to the function. In a possible implementation, the communication apparatus includes: A transceiver module configured to receive a plurality of pieces of first information, where the plurality of pieces of first information are in one-to-one correspondence with a plurality of communication apparatuses, each piece of first information indicates a geographical location of a corresponding communication apparatus, the transceiver module is further configured to send a group identifier of a first device group to which a first communication apparatus belongs, where the first communication apparatus is one of the plurality of communication apparatuses, and the first device group belongs to one of at least one device group determined by grouping, based on the plurality of pieces of first information, the plurality of communication apparatuses, and the transceiver module is further configured to send second information, where the second information includes the group identifier of the first device group, and the second information indicates a communication apparatus in the first device group to perform beam switch, to switch to a first beam.

In this way, the first communication apparatus may report geographical location information of the first communication apparatus at an interval of a period of time, and the second communication apparatus may update, in real time, a group identifier of a device group to which a communication apparatus belongs.

In this way, the plurality of communication apparatuses are grouped based on the geographical location information, and the second communication apparatus is enabled to indicate, based on the device group, communication apparatuses that belong to a same device group to perform a same beam switch, to reduce the signaling overhead for indicating a beam switch of the plurality of communication apparatuses.

In a possible implementation, the second information further includes information about the first beam.

In this way, the information about the first beam may include an identifier of the first beam.

In this way, the second communication apparatus is enabled to more accurately indicate the communication apparatus in the first device group to perform beam switch based on the information about the first beam.

In a possible implementation, the transceiver module is further configured to: send the second information on a first resource, where the first resource is indicated by third information, and a resource occupied for transmission of the third information is determined based on at least one of the following methods: semi-static allocation, or a calculation based on the group identifier of the first device group.

In this way, the second communication apparatus may perform semi-static allocation for a time domain and frequency domain resource occupied for the transmission of the third information.

In this way, the second communication apparatus may flexibly allocate, to communication apparatuses in different device groups, the resource occupied for the transmission of the third information.

In a possible implementation, the second information further includes at least one of the following parameters: a time at which the communication apparatus in the first device group starts to perform beam switching and a first time offset, where the first time offset is a time interval between a time at which the communication apparatus in the first device group receives fourth information and a time at which the communication apparatus in the first device group receives the third information, and the fourth information is updated information of the third information.

In this way, the first time offset may also be understood as indicating a time at which the communication apparatus in the first device group reads the fourth information on a semi-statically allocated resource. The fourth information being updated information of the third information may be understood as information that corresponds to beam switching performed by the communication apparatus in the first device group next time and that has a same function as the third information.

In this way, the time at which the communication apparatus in the first device group performs beam switching and the time at which the fourth information is read can be more accurately indicated.

In a possible implementation, the third information and the fourth information are scrambled by using a cell-level or beam-level radio network temporary identifier (RNTI).

In this way, the communication apparatus in the first device group is enabled to more accurately recognize the third information and the fourth information based on information scrambled by using the cell-level or beam-level RNTI. It should be understood that the cell-level or beam-level RNTI may be a currently reserved RNTI.

In a possible implementation, the second information is included in downlink control information DCI.

In this way, the signaling overhead of the DCI for indicating the beam switching of the plurality of communication apparatuses by the second communication apparatus are reduced.

In a possible implementation, the second information includes a first list, where the first list includes the group identifier of the first device group and a group identifier of a second device group.

In this way, the first communication apparatus in a device group is enabled to determine, based on whether the first list includes an identifier of the device group to which the first communication apparatus belongs, whether beam switching needs to be performed.

In a possible implementation, the second information is carried on a first media access control control element (MAC CE), and a type of the second information is indicated by a logical channel identifier LCD value in a first MAC protocol data unit PDU.

In a possible implementation, each instance of first information further indicates a movement state of the corresponding communication apparatus.

In this way, the movement state may include a movement speed and a movement direction.

In this manner, the second communication apparatus is enabled to more accurately group a communication apparatus in motion.

According to a seventh aspect, a communication apparatus is provided. The communication apparatus functions to implement the exemplary method in the third aspect. A function may be implemented by hardware, or may be implemented by hardware executing corresponding software. The hardware or software includes one or more modules corresponding to the function. In a possible implementation, the communication apparatus includes: A transceiver module configured to send first information, where the first information indicates geographical location information of a first communication apparatus, and the first information is used by a second communication apparatus to determine information about a candidate switch beam set of the first communication apparatus, the transceiver module is further configured to receive the information about the candidate switch beam set, and the transceiver module is further configured to receive second information, where the second information indicates to the first communication apparatus to switch to a first beam in the candidate switch beam set, and the first beam is one of the beams supported by the second communication apparatus.

In this way, the candidate switch beam set may be a subset of one switch beam set. In this way, the candidate switch beam set may be indicated based on the first information, and the second information indicates one first beam from the candidate switch beam set. In this way, one first beam is selected from a larger switch beam set without increasing the signaling overhead of the second information.

In a possible implementation, the second information includes an identifier of the first beam or an index corresponding to the candidate switch beam set, and is included in first downlink control information DCI.

For example, the first DCI may be scrambled by using a cell-level or beam-level radio network temporary identifier (RNTI), or a frequency domain resource assignment field may be set to all 0s, representing that the first DCI indicates beam switching.

In this way, the first DCI is reused for indicating to a communication apparatus to perform beam switching. For example, the first DCI may be a DCI that indicates to the communication apparatus to change from an idle state to a connected state.

In a possible implementation, the first information further indicates a movement state of the first communication apparatus.

In this way, the movement state may include a movement speed and a movement direction.

In this way, the second communication apparatus is enabled to more accurately determine the information about the candidate switch beam set of the first communication apparatus.

In a possible implementation, the information about the candidate switch beam set is carried in a first media access control control element (MAC CE).

According to an eighth aspect, a communication apparatus is provided. For beneficial effects, refer to descriptions in the fourth aspect. Details are not described herein again. The communication apparatus functions to implement the exemplary method in the fourth aspect. A function may be implemented by hardware, or may be implemented by hardware executing corresponding software. The hardware or software includes one or more modules corresponding to the function. In a possible implementation, the communication apparatus includes: A transceiver module configured to receive first information, where the first information indicates geographical location information of a first communication apparatus, the transceiver module is further configured to send information about a candidate switch beam set, where the information about the candidate switch beam set is determined based on the first information, and the transceiver module is further configured to send second information, where the second information indicates to the first communication apparatus to switch to a first beam in the candidate switch beam set, and the first beam is one of the beams supported by the second communication apparatus.

In this manner, the candidate switch beam set may be a subset of one switch beam set. In this manner, the candidate switch beam set may be indicated based on the first information, and the second information indicates one first beam from the candidate switch beam set. In this way, one first beam is selected from a larger switch beam set without increasing the signaling overhead of the second information.

In a possible implementation, the second information includes an identifier of the first beam or an index corresponding to the candidate switch beam set, and is included in first downlink control information DCI.

For example, the first DCI may be scrambled by using a cell-level or beam-level radio network temporary identifier (RNTI), or a frequency domain resource assignment field may be set to all 0s, representing that the first DCI indicates beam switching.

In this way, the first DCI is reused for indicating to a communication apparatus to perform beam switching. For example, the first DCI may be a DCI that indicates to the communication apparatus to change from an idle state to a connected state.

In a possible implementation, the first information further indicates a movement state of the first communication apparatus.

The movement state may include a movement direction and a movement speed.

In this way, the second communication apparatus is enabled to more accurately determine the information about the candidate switch beam set of the first communication apparatus.

In a possible implementation, the information about the candidate switch beam set is carried in a first media access control control element (MAC CE).

According to a ninth aspect, a communication apparatus is provided. The communication apparatus may be the first communication apparatus in the method embodiments, or may be a chip disposed in the communication apparatus. The communication apparatus includes a communication interface and a processor, and optionally, further includes a memory. The memory is configured to store a computer program or instructions. The processor is coupled to the memory and the communication interface. When the processor executes the computer program or the instructions, the communication apparatus is enabled to perform the method performed by the communication apparatus in the method embodiments.

For example, the memory and the processor may be integrated together, or may be independent components.

According to a tenth aspect, a communication apparatus is provided. The communication apparatus may be the second communication apparatus in the method embodiments, or a chip disposed in a second communication apparatus. The communication apparatus includes a communication interface and a processor, and optionally, further includes a memory. The memory is configured to store a computer program or instructions. The processor is coupled to the memory and the communication interface. When the processor executes the computer program or the instructions, the communication apparatus is enabled to perform the method performed by the second communication apparatus in the method embodiments.

For example, the memory and the processor may be integrated together, or may be independent components.

According to an eleventh aspect, a computer program product is provided. The computer program product includes computer program code. When the computer program code is run, the methods performed by the first communication apparatus in the aspects are performed.

According to a twelfth aspect, a computer program product is provided. The computer program product includes computer program code. When the computer program code is run, the methods performed by the second communication apparatus in the aspects are performed.

According to a thirteenth aspect, this application provides a chip system. The chip system includes a processor, configured to implement the functions of the first communication apparatus in the methods of the aspects. In a possible design, the chip system further includes a memory, configured to store program instructions and/or data. The chip system may include a chip, or may include a chip and another discrete component.

According to a fourteenth aspect, this application provides a chip system. The chip system includes a processor, configured to implement the functions of the second communication apparatus in the methods of the aspects. In a possible design, the chip system further includes a memory, configured to store program instructions and/or data. The chip system may include a chip, or may include a chip and another discrete component.

According to a fifteenth aspect, this application provides a computer-readable storage medium. The computer-readable storage medium stores a computer program. When the computer program is run, the methods performed by the first communication apparatus in the aspects are implemented.

According to a sixteenth aspect, this application provides a computer-readable storage medium. The computer-readable storage medium stores a computer program. When the computer program is run, the methods performed by the second communication apparatus in the aspects are implemented.

In this application, the plurality of communication apparatuses are grouped by using the second communication apparatus, and the plurality of communication apparatuses are grouped into at least one device group, so that when the plurality of communication apparatuses need to perform simultaneous switching, the second communication apparatus can send, based on the device group, the DCI that indicates beam switching, to reduce the signaling overhead of the DCI.

DESCRIPTION OF EMBODIMENTS

Figure 1:
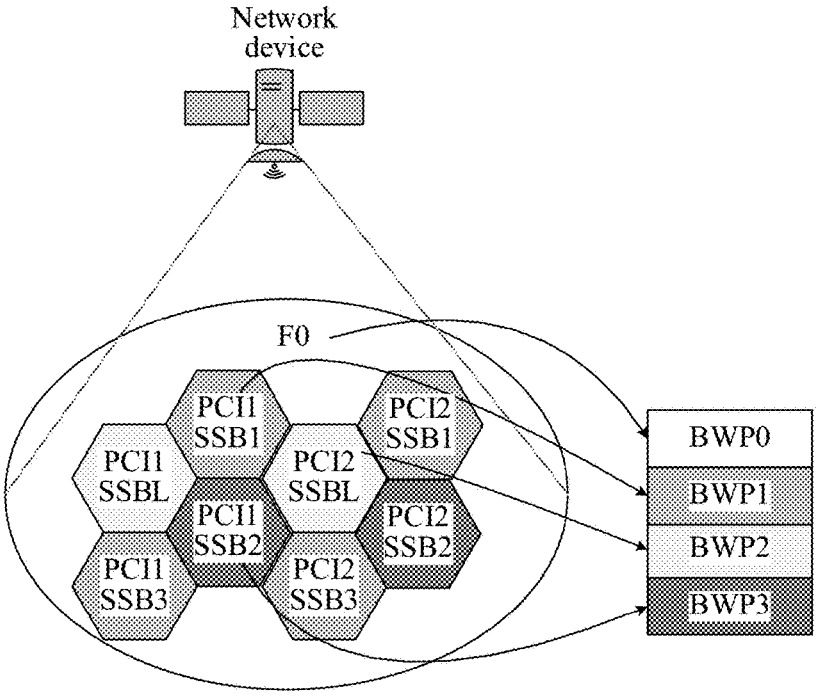
FIG. 1 is a schematic diagram of four-color frequency division multiplexing to which an embodiment of this application is applicable.

The following describes technical solutions of this application with reference to the accompanying drawings. Clearly, the described embodiments are some but not all of embodiments of this application. All other embodiments obtained by a person of ordinary skill in the art based on embodiments of this application without creative efforts shall fall within the protection scope of this application.

It should be further understood that "first", "second", "third", "fourth", and "fifth" in embodiments of this application are merely used for differentiation, and should not constitute any limitation on this application.

The technical solutions of embodiments of this application may be applied to various communication systems, for example, a global system for mobile communications (GSM), a code division multiple access (CDMA) system, a wideband code division multiple access (WCDMA) system, a general packet radio system (GPRS), a long term evolution (LTE) system, an LTE frequency division duplex (FDD) system, an LTE time division duplex (TDD) system, a universal mobile telecommunications system (UMTS), a worldwide interoperability for microwave access (WiMAX) communication system, a 5th generation (5G) system or a new radio (NR) system, a satellite communication system, and a future 6th generation (6G) system.

A terminal device in embodiments of this application may alternatively be referred to as user equipment (UE), an access terminal, a subscriber unit, a terminal device station, a mobile console, a mobile station (MS), a remote station, a remote terminal, a mobile device, a user terminal, a terminal, a wireless communication device, a terminal device agent, or a terminal device apparatus. The terminal device may include various handheld devices, vehicle-mounted devices, wearable devices, or computing devices that have a wireless communication function, or other processing devices connected to a wireless modem. The terminal device may further include a user unit, a cellular phone, a smartphone, a wireless data card, a personal digital assistant (PDA) computer, a tablet computer, a wireless modem, a handset, a laptop computer, a machine type communication (MTC) terminal, or a station (ST) in a wireless local area network (WLAN). The terminal device may be a cellular phone, a cordless telephone, a session initiation protocol (SIP) telephone, a wireless local loop (WLL) station, a terminal device in a next generation communication system such as a 5G network or a future evolved PLMN network, or the like.

A network device in embodiments of this application may be a device configured to communicate with the terminal device. The network device may be a base transceiver station (BTS) in a GSM system or a CDMA system, may be a NodeB (NB) in a WCDMA system, may be an evolved NodeB (eNB or eNodeB) in an LTE system, may be a radio controller in a cloud radio access network (CRAN) scenario, or may be a satellite in a satellite communication system. Alternatively, the network device may be a relay station, an access point, a vehicle-mounted device, a wearable device, a network device in a 5G network or in a future evolved PLMN, or the like. This is not limited in embodiments of this application.

It should be noted that the technical solutions in embodiments of this application may be applicable to an architecture of a central unit (CU) and a distributed unit (DU), or may be applicable to an architecture in which a control plane (CP) and a user plane (UP) are separated. This is not limited in this application.

For ease of understanding, the following briefly describes basic concepts in embodiments of this application.

Beam division: Beams are divided based on a frequency domain range. For example, to reduce an inter-beam interference level, a main method provided in a current proposal related to a non-terrestrial network (NTN) is beam division of multi-color frequency division multiplexing. Based on an NR standard, a terminal supports a maximum of four bandwidth parts (BWPs). In the current proposal, the beam division using four-color multiplexing is mainly considered. FIG. 1 is a schematic diagram of four-color frequency division multiplexing applicable to an embodiment of this application. In four-color multiplexing, a BWP0 serves as a synchronization frequency band of a BWP1, a BWP2, and a BWP3, a synchronization signal block (SSB) is sent in the BWP0, and service communication is mainly performed in frequency bands of the BWP1, the BWP2, and the BWP3, where a PCI is a physical cell identifier (PCI).

Beam switching: When a terminal device is at an edge of a beam, because a signal capability of a used beam is weak, the terminal device needs to switch to a coverage area of a beam with a strong signal to perform data transmission.

Figure 2:
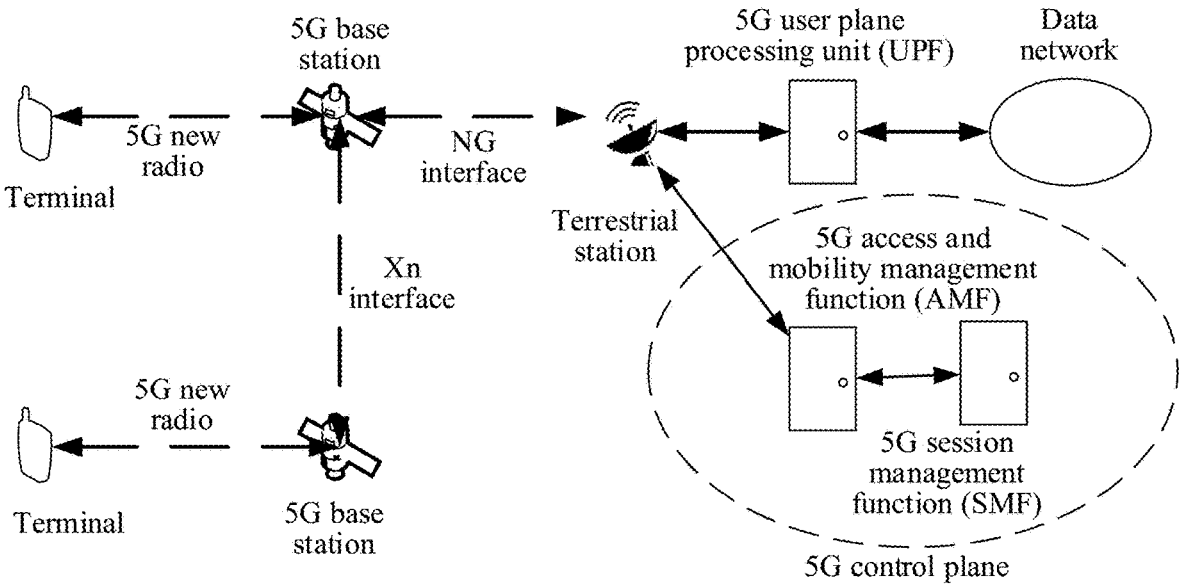
FIG. 2 is a diagram of an example of an application scenario to which an embodiment of this application is applicable.

FIG. 2 is a diagram of an example of an application scenario applicable to an embodiment of this application. In FIG. 2, a terrestrial mobile terminal accesses a network by using a 5G new radio, and a 5G base station is deployed on a satellite, and is connected to a terrestrial core network over a radio link. In addition, the radio link exists between satellites, to implement signaling exchange and user data transmission between base stations. Network elements and interfaces thereof in FIG. 2 are described as follows:

Terminal: Refers to descriptions related to the foregoing terminal device, and the terminal may access a satellite network through an air interface, and initiate services such as a call and internet access.

5G base station: In a 5G system, the 5G base station mainly provides wireless access services, for example, schedules a radio resource to an access terminal, and provides a reliable wireless transmission protocol and a data encryption protocol.

5G core network: The 5G core network includes services such as user access control, mobility management, session management, user security authentication, and charging. The 5G core network includes a plurality of functional units, and may be divided into a control-plane functional entity and a data-plane functional entity. An access and mobility management unit (AMF) is responsible for user access management, security authentication, and mobility management. A user plane unit (UPF) is responsible for managing user-plane data transmission, traffic statistics collection, and other functions.

Terrestrial station: The terrestrial station is responsible for forwarding signaling and service data between a satellite and a 5G core network.

5G new radio: The 5G new radio is a radio link between a terminal and a base station.

Xn interface: The Xn interface is an interface between 5G base stations, and is mainly for signaling exchange such as switching.

NG interface: The NG interface is an interface between a 5G base station and a 5G core network, and is mainly for exchanging signaling, for example, non-access stratum (NAS) of a core network, and exchanging service data of a user.

In the foregoing scenario, currently, a solution applied to beam switching includes mapping a BWP to a beam, converting the beam switch into BWP switch, and performing BWP activation based on downlink control information (DCI) and radio resource control (RRC) signaling, to implement beam switching of the terminal device. However, when a plurality of terminal devices need to simultaneously perform beam switching, a satellite needs to consume high signaling overhead of the DCI for indication, resulting in a severe resource shortage.

In this application, a satellite triggers beam switching based on UE grouping, to reduce the signaling overhead of the DCI. The following describes specific embodiments of a satellite communication method in this application.

Figure 3:
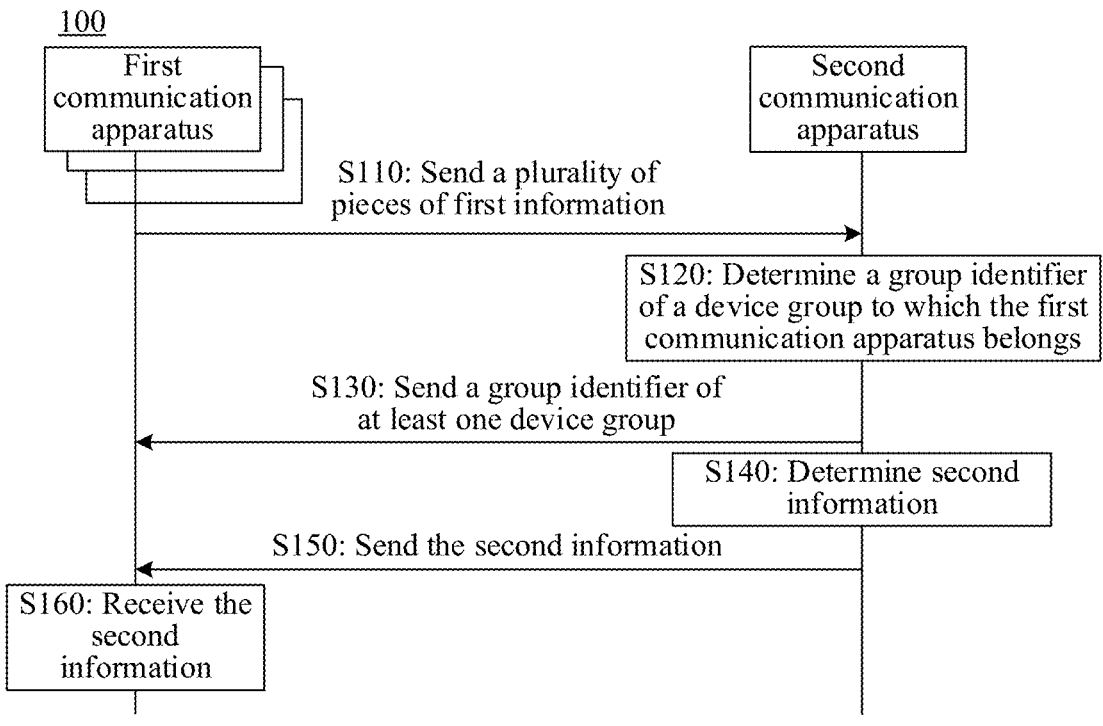
FIG. 3 is a schematic flowchart of an example of a satellite communication method according to an embodiment of this application.

FIG. 3 is a schematic flowchart of an example of a satellite communication method according to an embodiment of this application.

S110: A plurality of first communication apparatuses including a first communication apparatus send a plurality of instances of first information to a second communication apparatus.

The plurality of instances of first information are in one-to-one correspondence with the plurality of first communication apparatuses, and each instance of first information indicates a geographical location of a corresponding communication apparatus. The first communication apparatus may be a terminal device, and the second communication apparatus may be a satellite.

In a possible implementation, the first information further indicates a movement state of the corresponding communication apparatus, where the movement state may include a movement speed and a movement direction.

S120: The second communication apparatus groups the plurality of first communication apparatuses based on the plurality of instances of first information, to determine at least one device group.

The following uses an example in which a group identifier #1 of a device group to which the first communication apparatus belongs is determined based on the first information sent by the first communication apparatus for description. There are two methods as follows:

Method a

The second communication apparatus determines the group identifier #1 based on geographical location information of the first communication apparatus. For example, if the first communication apparatus is located in an area A (where a longitude is Aj, a latitude is Aw, and a height above the ground is Ah), the group identifier #1 is a. If the first communication apparatus is located in an area B (where a longitude is Bj, a latitude is Bw, and a height above the ground is Bh), the group identifier #1 is b. In this scenario, the first communication apparatus may be a communication apparatus at a fixed location, for example, a sensor.

Method b

The second communication apparatus determines the group identifier #1 based on movement state information and geographical location information of the first communication apparatus. For example, if the first communication apparatus is located in an area A, a speed is v1, and the movement direction is a direction N, the group identifier #1 is av1N. If the first communication apparatus is located in an area A, a speed is v2, and the movement direction is a direction S, the group identifier #1 is av2S. If the first communication apparatus is located in an area B, a speed is v3, and the movement direction is a direction S, the group identifier #1 is bv3S.

In a possible implementation, the first communication apparatus may report the geographical location information of the first communication apparatus at an interval of a period of time, and the second communication apparatus may update, in real time, the group identifier of the device group to which the first communication apparatus belongs.

S130: The second communication apparatus sends group identifiers corresponding to the plurality of communication apparatuses, and the plurality of communication apparatuses receive the group identifiers corresponding to the plurality of communication apparatuses.

For example, the second communication apparatus sends the group identifier #1 of a first device group to which the first communication apparatus belongs, and the first communication apparatus receives the group identifier #1.

The following methods are described by using the first communication apparatus as an example.

S140: The second communication apparatus determines second information.

The second information includes the group identifier #1 of the first device group, and the second information indicates a communication apparatus in the first device group to perform beam switching, to switch to a first beam.

In a possible implementation, the second information further includes information about the first beam. The information about the first beam may include an identifier of the first beam.

In a possible implementation, the second communication apparatus sends the second information on a first resource, where the first resource is indicated by third information, and a first time-frequency resource occupied for transmission of the third information may be determined in the following manners.

Method c

The second communication apparatus uses a part of, or all of, reserved time-frequency resources as the first time-frequency resource (where the first time-frequency resource is a time domain and frequency domain resource). An allocation method may be semi-static allocation. The second communication apparatus may perform semi-static allocation on the first time-frequency resource occupied for the transmission of the third information.

In a possible implementation, time-frequency resource allocation is performed by using a device group as a granularity. For example, at an interval of a period of time (which may be a periodicity), a part of, or all of, reserved time-frequency resources allocated to the device group to which the first communication apparatus belongs serve as the first time-frequency resource, and the third information is sent to the device group to which the first communication apparatus belongs on the first time-frequency resource. Communication apparatuses in the device group to which the first communication apparatus belongs can receive the third information on the first time-frequency resource. In other words, time-frequency resources on which communication apparatuses in a same device group receive the third information are the same.

In a possible implementation, time-frequency resource allocation is performed by using a communication apparatus as a granularity. For example, at an interval of a period of time (which may be a periodicity), a part of, or all of, reserved time-frequency resources allocated to the first communication apparatus serve as the first time-frequency resource, and the third information is sent to the first communication apparatus on the first time-frequency resource. In other words, time-frequency resources on which communication apparatuses in a same device group receive the third information may be different.

The second communication apparatus may notify, based on a system information block (SIB) message or a communication apparatus-specific RRC message, the first time-frequency resource that is semi-statically allocated to the first communication apparatus.

Method d

The second communication apparatus calculates an ID of the first time-frequency resource based on the group identifier (group identifier #1) of the device group to which the first communication apparatus belongs.

In a possible implementation, the ID of the first time-frequency resource is calculated based on the group identifier #1 by using a first function. The first function may be expressed as $y=f(x)$, where y represents the ID of the first time-frequency resource, and x represents the group identifier #1. It is assumed that reserved time-frequency resources are divided into 5 time-frequency resources, an ID set of the 5 time-frequency resources is $\{0, 1, 2, 3, 4\}$, and determined group identifiers of the plurality of communication apparatuses include 1 to 10. For example, the first function is a modulo function (mod). For example, $y=(x)\mathrm{mod}(a)$, where a is a positive integer, and a may be a size of the ID set of the time-frequency resources. An example in which the group identifier #1 corresponding to the first communication apparatus is 2 is used. If the ID of the first time-frequency resource is $(y)=(2)\mathrm{mod}(5)=2$, the ID of the first time-frequency resource is 2. The first function may alternatively be a rounding function ([ ]). For example, $y=[x/a]$, where a is a positive integer, and a may be a size of the ID set of the time-frequency resources. An example in which the group identifier #1 corresponding to the first communication apparatus is 2. If the ID of the first time-frequency resource is $(y)=[2/5]=0$, the ID of the first time-frequency resource is 0.

For another manner of calculating, based on the group identifier #1 corresponding to the first communication apparatus, the ID of the first time-frequency resource by using the first function, refer to the foregoing descriptions. Details are not described herein again in this application.

Method e

The second communication apparatus uses, in a semi-static allocation manner, a part of, or all of, reserved time-frequency resources as a resource #1, for sending the third information to all communication apparatuses that need to perform beam switching, where all the communication apparatuses that need to perform beam switching include the first communication apparatus. The first time-frequency resource occupied by the third information sent to the first communication apparatus is a part of the resource #1, and then the first time-frequency resource is calculated, based on the group identifier #1 corresponding to the first communication apparatus, by using a first function. The first function may be expressed as $y=f(x)$, where y represents the ID of the first time-frequency resource, and x represents the group identifier #1 corresponding to the first communication apparatus. For example, resources allocated for sending the third information by the second communication apparatus to all the communication apparatuses that need to perform beam switching are a time-frequency resource #A. The time-frequency resource #A includes five parts, and a resource ID set of the five parts is $\{0, 1, 2, 3, 4\}$. The first function may be a modulo function (mod). For example, $y=(x)\mathrm{mod}(a)$, where a is a positive integer, and a may be a size of the ID set of the time-frequency resource. An example in which the group identifier #1 corresponding to the first communication apparatus is 2 is used. If the ID of the first time-frequency resource is $(y)=(2)\mathrm{mod}(5)=2$, the ID of the first time-frequency resource is 2.

For another method of calculating, based on the group identifier #1 corresponding to the first communication apparatus, the ID of the first time-frequency resource by using the first function, refer to the foregoing descriptions. Details are not described herein again in this application.

Method f

Correspondences between group identifiers of different device groups and different resource IDs are preconfigured in the second communication apparatus and the first communication apparatus. After the second communication apparatus notifies the group identifier #1 of the first communication apparatus, the first communication apparatus and the second communication apparatus may learn of the ID of the first time-frequency resource based on the correspondences. For example, the correspondences are configured in the second communication apparatus and the first communication apparatus in a table form, as shown in Table 1.

TABLE 1

| Group ID | Time-frequency resource ID |
|---|---|
| 1 | s1 |
| 2 | s3 |
| 3 | s2 |
| 4 | s4 |
| 5 | s5 |

For example, when the group identifier #1 corresponding to the first communication apparatus is 1, the ID of the first time-frequency resource is s1. When the group identifier #1 corresponding to the first communication apparatus is 3, the ID of the first time-frequency resource is s2.

It should be understood that the correspondences between group identifiers of device groups and time-frequency resource IDs in Table 1 are merely examples for description. This is not limited in this application.

In a possible implementation, the second information further includes at least one of the following parameters: a time at which the communication apparatus in the first device group starts to perform beam switching and a first time offset, where the first time offset is a time interval between a time at which the communication apparatus in the first device group receives fourth information and a time at which the communication apparatus in the first device group receives the third information, and the fourth information is updated information of the third information.

In this way, the first time offset may also be understood as indicating a time at which the communication apparatus in the first device group reads the fourth information on a semi-statically allocated resource. The fourth information being updated information of the third information may be understood as information that corresponds to beam switching performed by the communication apparatus in the first device group next time and that has a same function as the third information.

In a possible implementation, the third information and the fourth information are scrambled by using a cell-level or beam-level radio network temporary identifier (RNTI). The cell-level or beam-level RNTI may be a currently reserved RNTI.

In a possible implementation, the second information is included in downlink control information DCI.

In a possible implementation, the second information includes a first list, where the first list may include the group identifier of the first device group and a group identifier of a second device group.

In a possible implementation, the second information is carried on a first media access control control element (MAC CE), and a type of the second information is indicated by a logical channel identifier LCID value in a first MAC protocol data unit PDU.

S150: The second communication apparatus sends the second information.

In a possible implementation, the second communication apparatus may further send the third information to the first communication apparatus.

S160: The first communication apparatus receives the second information, and determines, based on the second information, whether beam switching needs to be performed.

In a possible implementation, the first communication apparatus may determine, based on whether the first list includes the identifier of the first device group, whether beam switching needs to be performed. If the first list includes the identifier of the first device group, beam switching is performed. If the first list does not include the identifier of the first device group, beam switching is not performed.

In a possible implementation, the first communication apparatus may further receive the second information on a resource indicated by the third information.

The following describes an embodiment of this application by using an example in which the first communication apparatus is a user equipment #1 (UE #1), and the second communication apparatus is a satellite #1.

Figure 4:
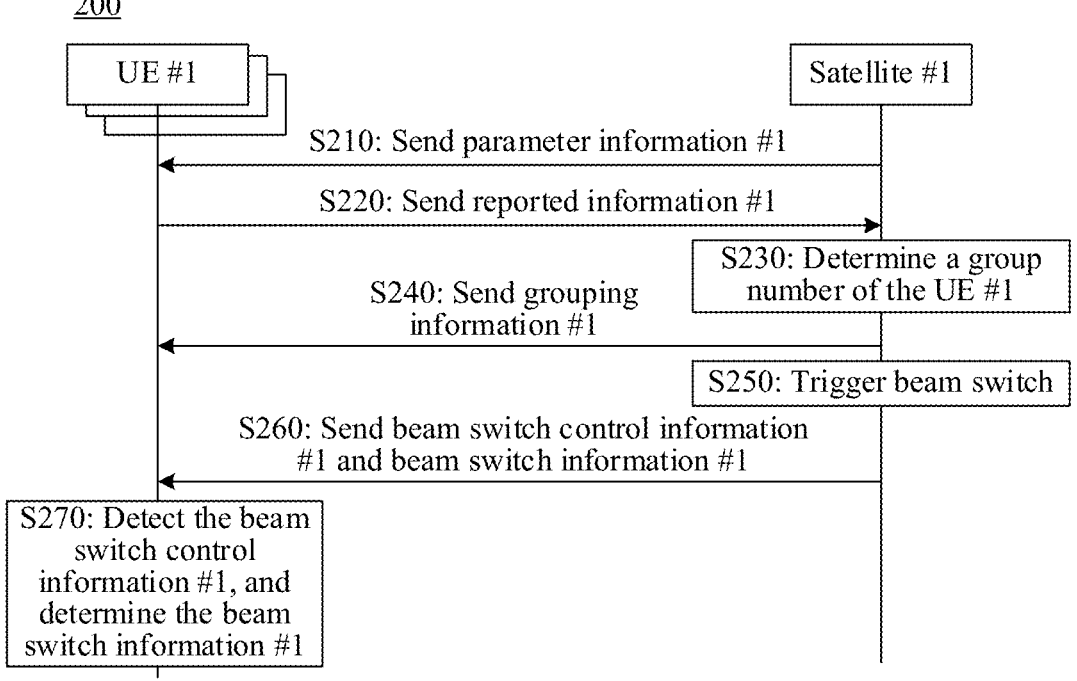
FIG. 4 is a schematic flowchart of another example of a satellite communication method according to an embodiment of this application.

FIG. 4 is a schematic flowchart of another example of a satellite communication method according to an embodiment of this application.

As shown in the method 200 in FIG. 4, details are as follows:

S210: A satellite #1 sends parameter information #1, and a plurality of UEs including UE #1 receive the parameter information #1.

The parameter information #1 includes parameter configuration information of one or more beams. The parameter configuration information corresponding to each beam may include one or more of the following information:

a beam identifier (ID), where the beam identifier may also be referred to as an ID of a beam;

a BWP ID, that is, an ID of a BWP corresponding to the beam, where "corresponding" herein means that when beam switching is converted into BWP switching, each beam corresponds to one BWP, where for example, a beam #1 corresponds to a BWP #1, and a beam #2 corresponds to a BWP #2; when the beam #1 is switched to the beam #2, it may be converted to switching the BWP #1 to the BWP #2;

a frame structure, that is, a structure of a frame transmission on the beam;

a center frequency, that is, a center frequency of a BWP; and an access parameter, that is, parameter information for performing random access by an UE, for example, a time domain position for the random access and a location of a resource block for the random access.

In a possible implementation, the parameter information #1 may be carried in a broadcast message.

S220: The plurality of UEs including the UE #1 send a plurality of instances of reported information to the satellite #1. The following uses reported information #1 sent by the UE #1 as an example for description.

The reported information #1 includes geographical location information and/or movement state information of the UE #1. The geographical location information of the UE #1 may be information about an area in which the UE #1 is located, for example, an area A. The movement state information of the UE #1 may be a movement speed and/or a movement direction of the UE #1. The movement direction is a direction of the UE when the UE moves, and may be an absolute direction on the earth, or may be a relative direction relative to a reference point. A unit of the movement speed may be a kilometer per hour (km/h).

In a possible implementation, the reported information #1 may be carried in RRC signaling.

In a possible implementation, the UE #1 may send the reported information #1 to the satellite #1 during the random access or after the random access is completed.

S230: The satellite #1 determines group identifiers (group IDs) of device groups to which the plurality of UEs including the UE #1 belong.

The satellite #1 may determine, based on the plurality of instances of reported information, the group identifiers of the device groups to which the plurality of UEs belong. For determining, based on the reported information #1, a group identifier #1 of the device group to which the UE #1 belongs, refer to Method a and Method b in the method 120.

In a possible implementation, the group identifier (which may also be referred to as a group identifier corresponding to the UE #1) of the device group to which the UE #1 belongs may be updated based on a geographical location and/or a movement state of the UE #1. In other words, the group identifier corresponding to the UE #1 may be periodically or non-periodically re-determined at an interval of a period of time based on the geographical location and/or the movement state reported by the UE #1. For a specific manner, refer to Method a and Method b. Details are not described herein again in this application.

S240: The satellite #1 sends grouping information #1, and the plurality of UEs including the UE #1 receive the grouping information #1.

The grouping information #1 includes group identifiers corresponding to the plurality of UEs. The following uses the UE #1 as an example for description.

In a possible implementation, the grouping information #1 may be carried in a random access message 4 (Msg4). Optionally, if the UE #1 completes the random access and enters a connected state, the grouping information #1 may further be carried in a UE-specific radio resource control (UE-specific RRC) message.

S250: The satellite #1 triggers beam switching.

The satellite #1 triggers the beam switch based on a grouping status of the plurality of UEs including the UE #1.

The following uses the UE #1 as an example for description. Because grouping of the UE #1 is based on the geographical location and/or the movement state of the UE #1, the satellite #1 triggers the beam switch based on the grouping status of the UE #1. This may also be understood as: The satellite #1 triggers the beam switch based on the geographical location and/or the movement state of a group to which the UE #1 belongs. For example, when a movement range of the satellite #1 needs to go beyond the area A, a group to which the UE #1 in the area A belongs needs to perform beam switching. Alternatively, when the movement state of the group to which the UE #1 belongs changes, beam switching needs to be performed. For example, it is determined, based on the movement state of the group to which the UE #1 belongs, that a beam range of the UE #1 changes after a specific period of time, and beam switching needs to be performed. Alternatively, when a geographical location of the group to which the UE #1 belongs changes, another beam range needs to be switched to. Specific steps are as follows:

Step a: The satellite #1 selects one of the reserved radio network temporary identifiers (RNTIs) as a scrambling ID of beam switch control information.

For example, the reserved RNTIs include FFF0 to FFFD, and FFFD may serve as the scrambling ID of the beam switch control information. The following uses FFFD as the scrambling ID of the beam switch control information for description.

Step b: The satellite #1 sends, on a time-frequency resource #1, a trigger message #1 to the UE in the device group to which the UE #1 belongs. The following uses the UE #1 as an example for description.

The trigger message #1 includes beam switch control information #1 (where the beam switch control information #1 represents a specific instance of beam switch control information, and "#" in other parts of this application is similar to that in this description). The beam switch control information #1 is used to schedule the transmission of the beam switch information #1, and the beam switch control information #1 may include time-frequency resource information of the beam switch information #1. The trigger message #1 may be scrambled by using FFFD.

The beam switch information #1 indicates to the plurality of UEs including the UE #1 to perform beam switching. Each beam switch parameter group in the beam switch information #1 corresponds to one device group, and each beam switch parameter group may include one or more of the following parameters:

the group identifier of the device group to which the UE belongs;

a target beam ID corresponding to the device group to which the UE belongs, where the target beam ID indicates the UE in the device group to perform beam switching and switch to a beam with the target beam ID;

beam switch time corresponding to the device group to which the UE belongs, where the beam switch time indicates time at which the UE in the device group starts to perform beam switching; and a time offset corresponding to the device group to which the UE belongs, where the time offset indicates an offset between a moment at which the UE in the device group receives beam switch control information #2 (beam switch control information sent next time) and a moment at which the UE in the device group receives the beam switch control information #1 (beam switch control information sent this time).

The target beam ID and the beam switch time in a beam switch parameter group are determined by the satellite based on a geographical location and/or a movement state of the device group to which the UE belongs. There may be the following methods.

Method 1

The satellite determines, based on the geographical location of the device group to which the UE belongs, the target beam ID and the beam switch time for performing beam switching by the group to which the UE belongs. For example, after moving from another area to the area A, the UE group reports a geographical location to the satellite. After determining a group identifier based on the geographical location of the UE group, the satellite determines, based on beam coverage quality of the geographical location, a target beam ID to which the UE group needs to switch to. The time at which the UE group performs beam switching may be a time at which the UE group receives the beam switch information #1, or the satellite may specify a specific moment as the beam switch time. For another example, a UE in the group to which the UE belongs is a UE at a fixed location, and due to movement of the satellite #1, a beam covering the UE group is changed into a beam of a satellite #2. In this case, the satellite #1 determines that the target beam ID for the UE group to perform beam switching is a beam ID in the beam coverage area of the satellite #2. The time at which the UE group performs beam switching may be a moment at which the satellite #2 moves until the beam ID can cover the UE group.

Method 2

The satellite determines, based on the movement state and the geographical location of the device group to which the UE belongs, the target beam ID and the beam switch time for performing beam switching by the group to which the UE belongs. For example, beams in the coverage area A include the beam #1 and the beam #2. The group of UEs is currently in a coverage area of the beam #1. It is determined, based on a movement speed and a movement direction of the group of UEs, that the group of UEs moves to a coverage area of the beam #2 in the area A after time A elapses. In this case, an ID of the beam #2 may serve as the target beam ID, and the time A may serve as the beam switch time.

For example, content of the beam switch information #1 may be shown as follows:

```
Beam-switch-info ::=        SEQUENCE {
    Group-switch-List ::=        SEQUENCE (SIZE (1..maxGroupNumber)) OF
Group-switch-Info
}
Group-switch-Info ::=        SEQUENCE {
    UE-group-ID ::=             Group-ID
    Target-beam-ID ::=          Beam-ID
```

-continued

| Timer ::= | ENUMERATED {2 ms, 3 ms, 4 ms, 20 ms, 30 ms, ... |
| | 1920 ms, 2560 ms, ...} |
| OPTIONAL, | |
| TO-next ::= | Offset-Value |
| OPTIONAL, | |
| } | |

Beam-switch-info in the beam switch information #1 represents beam switch information, and Group-switch-List included in the beam switch information #1 represents a group identifier list of the device group to which the UE that needs to perform beam switching belongs.

maxGroupNumber in the beam switch information #1 represents a quantity of device groups that need to perform beam switching.

ENUMERATED{ } in the beam switch information #1 represents that a value in the list is used, and "ms" represents a millisecond, for example, "2 ms" represents 2 milliseconds. It should be noted that the value in the ENUMERATED{ } list is merely an example for description. This is not limited in this application. For example, the value in the ENUMERATED{ } list may be less than "2 ms", or may be greater than "2560 ms".

OPTIONAL in the beam switch information #1 represents another parameter that may be obtained from Group-switch-Info.

The Group-switch-Info in the beam switch information #1 represents a beam switch parameter group corresponding to one device group. The device group to which the UE #1 belongs is used as an example. A beam switch parameter group corresponding to the device group to which the UE #1 belongs includes the following parameters:

a UE group identifier (UE-group-ID): an ID of the device group to which the UE #1 belongs;

a target beam ID (Target-beam-ID): an ID of a beam to which the device group to which the UE #1 belongs needs to switch;

switch time (Timer): indicating a time at which the device group to which the UE #1 belongs performs beam switching, where the time may be absolute system time, or may be relative time (that is, relative time based on a time reference point, where for example, if the time reference point is t1, and the relative time is t2, time for performing beam switching is t1+t2), and a time unit may be a slot or a system frame number (SFN); and TO-next: indicating an offset between a moment at which the device group to which the UE #1 belongs receives corresponding beam switch control information #2 (beam switch control information sent next time) and a moment at which the device group to which the UE #1 belongs receives the beam switch control information #1 (beam switch control information sent this time), where Offset-Value is the offset.

In a possible implementation, the time-frequency resource #1 may be a trigger occasion (TO).

With reference to the manner of determining the first time-frequency resource in the method 100, the time-frequency resource #1 may be determined in the following three methods.

Method c1

The satellite #1 uses a part of, or all of, reserved time-frequency resources as the time-frequency resource #1. An allocation method may be semi-static allocation.

In a possible implementation, time-frequency resource allocation is performed by using a device group as a granularity. For example, at an interval of a period of time (which may be a periodicity), a part of or all of the reserved time-frequency resources allocated to the device group to which the UE #1 belongs serve as the time-frequency resource #1. In addition, the trigger message #1 is sent on the time-frequency resource #1 to the device group to which the UE #1 belongs. The UE in the device group to which the UE #1 belongs can receive the trigger message #1 on the time-frequency resource #1. In other words, time-frequency resources on which UEs in a same group receive a trigger message are the same.

In a possible implementation, time-frequency resource allocation is performed by using UE as a granularity. For example, at an interval of a period of time (which may be a periodicity), a part of, or all of, the reserved time-frequency resources allocated to the UE #1 serve as the time-frequency resource #1, and the trigger message #1 is sent on the time-frequency resource #1 to the UE #1. In other words, time-frequency resources on which UEs in a same group receive a trigger message may be different.

The satellite #1 may notify, based on a SIB message or a UE-specific RRC message, the time-frequency resource #1 that is semi-statically allocated to the UE #1.

Method d1

The satellite #1 calculates an ID of the time-frequency resource #1 based on the group identifier (group identifier #1) of the device group to which the UE #1 belongs.

In a possible implementation, the ID of the time-frequency resource #1 is calculated based on the group identifier #1 by using a first function. The first function may be expressed as $y=f(x)$, where y represents the ID of the time-frequency resource #1, and x represents the group identifier #1. It is assumed that the reserved time-frequency resources are divided into 5 time-frequency resources, an ID set of the 5 time-frequency resources is {0, 1, 2, 3, 4}, and group identifiers of UEs are divided into 1 to 10. For example, the first function is a modulo function (mod). For example, $y=(x)mod(a)$, where a is a positive integer, and a may be a size of the ID set of the time-frequency resources. An example in which the group identifier #1 corresponding to the UE #1 is 2 is used. If the ID of the time-frequency resource #1 is $(y)=(2)mod(5)=2$, the ID of the time-frequency resource #1 is 2. The first function may alternatively be a rounding function ([ ]). For example, $y=[x/a]$, where a is a positive integer, and a may be a size of the ID set of the time-frequency resources. An example in which the group identifier #1 corresponding to the UE #1 is 2 is used. If the ID of the time-frequency resource #1 is $(y)=[2/5]=0$, the ID of the time-frequency resource #1 is 0.

For another method of calculating, based on the group identifier #1 corresponding to the UE #1, the ID of the time-frequency resource #1 by using the first function, refer to the foregoing descriptions. Details are not described herein again in this application.

Method e1

The satellite #1 uses, in a semi-static allocation method, a part of, or all of, the reserved time-frequency resources as a resource #1, for sending the trigger message to all UEs that need to perform beam switching, where all the UEs that need to perform beam switching include the UE #1. The time-frequency resource #1 occupied by the trigger message #1 sent to the UE #1 is a part of the resource #1, and then the time-frequency resource #1 is calculated, based on the group identifier #1 corresponding to the UE #1, by using the first function. The first function may be expressed as $y=f(x)$, where y represents the ID of the time-frequency resource #1, and x represents the group identifier #1 corresponding to the UE #1. For example, resources allocated for sending the trigger message by the satellite #1 to all the UEs that need to perform beam switching are a time-frequency resource #A, the time-frequency resource #A includes five parts, and a resource ID set of the five parts is {0, 1, 2, 3, 4}. The first function may be a modulo function (mod). For example, $y=(x)\bmod(a)$, where a is a positive integer, and a may be a size of the ID set of the time-frequency resource. An example in which the group identifier #1 corresponding to the UE #1 is 2 is used. If the ID of the time-frequency resource #1 is $(y)=(2)\bmod(5)=2$, the ID of the time-frequency resource #1 is 2.

For another manner of calculating, based on the group identifier #1 corresponding to the UE #1, the ID of the time-frequency resource #1 by using the first function, refer to the foregoing descriptions. Details are not described herein again in this application.

Method f1

Correspondences between group identifiers of different device groups and different resource IDs are preconfigured in the satellite #1 and the UE #1. After the satellite #1 notifies the group identifier #1 of the UE #1, the satellite #1 and the UE #1 may learn of the ID of the time-frequency resource #1 based on the correspondences. For example, the correspondences are configured in the satellite #1 and the UE #1 in a table form, as shown in Table 2.

TABLE 2

| Group identifier (group ID) | Time-frequency resource ID |
|---|---|
| 1 | s1 |
| 2 | s3 |
| 3 | s2 |
| 4 | s4 |
| 5 | s5 |

For example, when the group identifier #1 corresponding to the UE #1 is 1, the ID of the time-frequency resource #1 is s1. When the group identifier #1 corresponding to the UE #1 is 3, the ID of the time-frequency resource #1 is s2.

It should be understood that the correspondences between group identifiers of device groups and time-frequency resource IDs in Table 2 are merely examples for description. This is not limited in this application.

In a possible implementation, when needing to trigger the beam switch, the satellite #1 occupies the time-frequency resource #1 for sending the trigger message #1. If the beam switch does not need to be triggered, the time-frequency resource #1 may be used for transmission of another service.

S260: The satellite #1 sends the beam switch control information #1 and the beam switch information #1, and the plurality of UEs including the UE #1 receive the beam switch control information #1 and the beam switch information #1.

In a possible implementation, the beam switch control information #1 is carried in the DCI.

In a possible implementation, the beam switch control information #1 is carried in the RRC signaling.

S270: The UE #1 is used as an example. The UE #1 determines the beam switch information #1 based on the beam switch control information #1.

The UE #1 detects, on the time-frequency resource #1, the beam switch control information #1 by using FFFD, and reads the beam switch information #1 on a resource on which the beam switch information #1 included in the beam switch control information #1 is located.

If the Group-switch-List in the beam switch information #1 includes the group identifier of the device group to which the UE #1 belongs, the UE #1 performs beam switching based on the beam switch parameter group corresponding to the device group to which the UE #1 belongs.

If the Group-switch-List in the beam switch information #1 does not include the group identifier of the device group to which the UE #1 belongs, the UE #1 does not perform beam switching.

In the foregoing embodiment, the beam switch is triggered by the satellite based on UE grouping. In a scenario that a plurality of UEs perform simultaneous switching, grouping the UEs can reduce the signaling overhead of the DCI consumed when a batch of UEs performs simultaneous switching.

Figure 5:
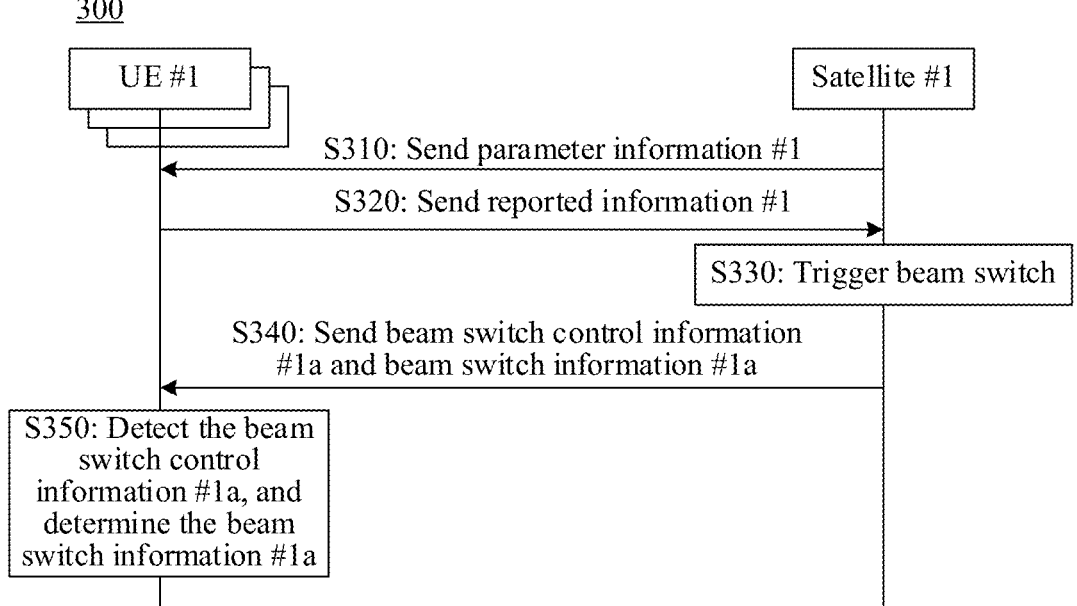
FIG. 5 is a schematic flowchart of another example of a satellite communication method according to an embodiment of this application.

This application further provides an implementation in which the satellite triggers the beam switch based on the UE as the granularity. FIG. 5 is a schematic flowchart of another example of a satellite communication method according to an embodiment of this application.

As shown in the method 300 in FIG. 5, details are as follows:

S310: A satellite #1 sends parameter information #1, and UE #1 receives the parameter information #1.

For content of the parameter information #1, refer to descriptions in S210. Details are not described herein again.

S320: The UE #1 sends reported information #1 to the satellite #1.

For content of the reported information #1, refer to descriptions in S220. Details are not described herein again.

S330: The satellite #1 triggers the beam switch.

The satellite #1 triggers the beam switch based on a geographical location and/or a movement state of the UE #1. For example, when a movement range of the satellite #1 needs to go beyond an area A, the UE #1 in the area A needs to perform beam switching. Alternatively, when the movement state of the UE #1 changes, beam switching needs to be performed. For example, it is determined, based on the movement state of the UE #1, that a beam range of the UE #1 changes after a specific period of time, and beam switching needs to be performed. Alternatively, when the geographical location of the UE #1 changes, another beam range needs to be switched to. Specific steps are as follows:

Step a: The satellite #1 selects one of the reserved RNTIs as a scrambling ID of the beam switch control information.

For example, the reserved RNTIs include FFF0 to FFFD, and FFFD may serve as the scrambling ID of the beam switch control information. The following uses FFFD as the scrambling ID of the beam switch control information for description.

Step b: The satellite #1 sends, on a time-frequency resource #1a, a trigger message #1a, where the trigger message #1a is used to trigger the beam switch of the UE #1.

The trigger message #1a includes beam switch control information #1a, where the beam switch control information

1a is used to schedule transmission of beam switch information #1a, and may include time-frequency resource information of the beam switch information #1a. The trigger message #1a may be scrambled by using FFFD.

The beam switch information #1a indicates one or more UEs including the UE #1 to perform beam switching. Each beam switch parameter group in the beam switch information #1a may include one or more of the following parameters:

an ID of UE;

a target beam ID corresponding to the UE, where the target beam ID indicates the UE to perform beam switching and switch to the target beam ID;

beam switch time corresponding to the UE, where the beam switch time indicates a time at which the UE starts to perform beam switching; and a time offset corresponding to the UE, where the time offset indicates an offset between a moment at which the UE receives the beam switch control information #2a (beam switch control information sent next time) and a moment at which the UE receives the beam switch control information #1a (beam switch control information sent this time).

For a method of determining the target beam ID and the beam switch time, refer to content in the method 200. Details are not described herein again.

For example, content of the beam switch information #1a may be shown as follows:

TO-next: indicating an offset between a moment at which the UE #1 receives corresponding beam switch control information #2a (beam switch control information sent next time) and a moment at which the UE #1 receives the beam switch control information #1a (beam switch control information sent this time).

In a possible implementation, the time-frequency resource #1a may be a TO.

The time-frequency resource #1a may be determined in the following three methods.

Method c2

The satellite #1 allocates a part of, or all of, reserved time-frequency resources that serve as the time-frequency resource #1a to the UE #1. An allocation method may be semi-static allocation.

In a possible implementation, time-frequency resource allocation is performed by using UE as a granularity. For example, at an interval of a period of time (which may be a periodicity), a part of, or all of, the reserved time-frequency resources allocated to the UE #1 serve as the time-frequency resource #1a, and the trigger message #1a is sent on the time-frequency resource #1a to the UE #1. In other words, time-frequency resources on which UEs with different IDs receive a trigger message may be different.

The satellite #1 may notify, based on a UE-specific RRC message, the time-frequency resource #1a that is semi-statically allocated to the UE #1.

```
Beam-switch-info ::=          SEQUENCE {
    UE-switch-List ::=        SEQUENCE (SIZE (1..maxGroupNumber)) OF UE-
switch-Info
    }
    UE-switch-Info ::=        SEQUENCE {
    UE-ID ::=                     UE-ID
    Target-beam-ID ::=            Beam-ID
    Timer ::=                     ENUMERATED {2 ms, 3 ms, 4 ms, 20 ms, 30
ms, ...
                                  1920 ms, 2560 ms, ...}
    OPTIONAL,
    TO-next ::=                   Offset-Value
    OPTIONAL,
    }
```

Beam-switch-info in the beam switch information #1a represents beam switch information, and UE-switch-List included in the beam switch information #1a represents an ID list of the UE that needs to perform beam switching.

UE-switch-List in the beam switch information #1a represents a list of the UE that needs to perform beam switching. For other parameters, refer to descriptions in the beam switch information #1 in the method 200. Details are not described herein again.

UE-switch-Info in the beam switch information #1a represents a beam switch parameter group corresponding to one UE. The UE #1 is used as an example. A beam switch parameter group corresponding to the UE #1 includes the following parameters:

a UE ID: an ID of the UE #1;

a target beam ID (Target-beam-ID): an ID of a beam to which the UE #1 needs to switch to;

switch time (Timer): indicating a time at which the UE #1 performs beam switching, where the time may be an absolute system time, or may be a relative time (that is, relative time based on a time reference point, where for example, if the time reference point is t1, and the relative time is t2, time for performing beam switching is t1+t2), and a time unit may be a slot or a system frame number (SFN); and Method d2

The satellite #1 calculates an ID of the time-frequency resource #1a based on the ID of the UE #1.

In a possible implementation, the ID of the time-frequency resource #1a is calculated based on the ID of the UE #1 by using the first function. For a specific manner, refer to descriptions of calculating the ID of the time-frequency resource #1 based on the group identifier of the UE #1 by using the first function in the method e in S250. Details are not described herein again in this application.

Method e2

The satellite #1 uses, in a semi-static allocation manner, a part of, or all of, reserved time-frequency resources as a resource #1a, for sending the trigger message to all UEs that need to perform beam switching, where all the UEs that need to perform beam switching include the UE #1. The time-frequency resource #1a occupied by the trigger message #1a sent to the UE #1 is a part of the resource #1a, and then the time-frequency resource #1a is calculated based on the ID of the UE #1 by using the first function. For a specific method, refer to descriptions of calculating the ID of the time-frequency resource #1 based on the group identifier of the UE #1 by using the first function in the method f in S250. Details are not described again in this application.

Method f2

Correspondences between different UE IDs and different resource IDs are preconfigured in the satellite #1 and the UE #1. The satellite #1 and the UE #1 may learn of the ID of the time-frequency resource #1a based on the correspondences. For example, the correspondences are configured in the satellite #1 and the UE #1 in a table form, as shown in Table 3.

TABLE 3

| UE identifier (UE ID) | Time-frequency resource ID |
|---|---|
| 1 | s1 |
| 2 | s3 |
| 3 | s2 |
| 4 | s4 |
| 5 | s5 |

For example, if the ID of the UE #1 is 1, the ID of the time-frequency resource #1a obtained by the UE based on Table 3 is s1.

It should be understood that the correspondences between UE IDs and time-frequency resource IDs in Table 3 are merely examples for description. This is not limited in this application.

In a possible implementation, when needing to trigger the beam switch, the satellite #1 occupies the time-frequency resource #1a for sending the trigger message #1a. If the beam switch does not need to be triggered, the time-frequency resource #1a may be used for transmission of another service.

S340: The satellite #1 sends the beam switch control information #1a and the beam switch information #1a, and the UE #1 receives the beam switch control information #1a and the beam switch information #1a.

In a possible implementation, the beam switch control information #1a may be carried in RRC signaling.

In a possible implementation, the beam switch control information #1a may be carried in DCI.

S350: The UE #1 determines the beam switch information #1a based on the beam switch control information #1a.

The UE #1 detects, on the time-frequency resource #1a, the beam switch control information #1a by using FFFD, and reads the beam switch information #1a on a resource on which the beam switch information #1a included in the beam switch control information #1a is located.

If UE-switch-List in the beam switch information #1a includes the ID of the UE #1, the UE #1 performs beam switching based on the beam switch parameter group corresponding to the UE #1.

If UE-switch-List in the beam switch information #1a does not include the ID of the UE #1, the UE #1 does not perform beam switching.

Figure 6:
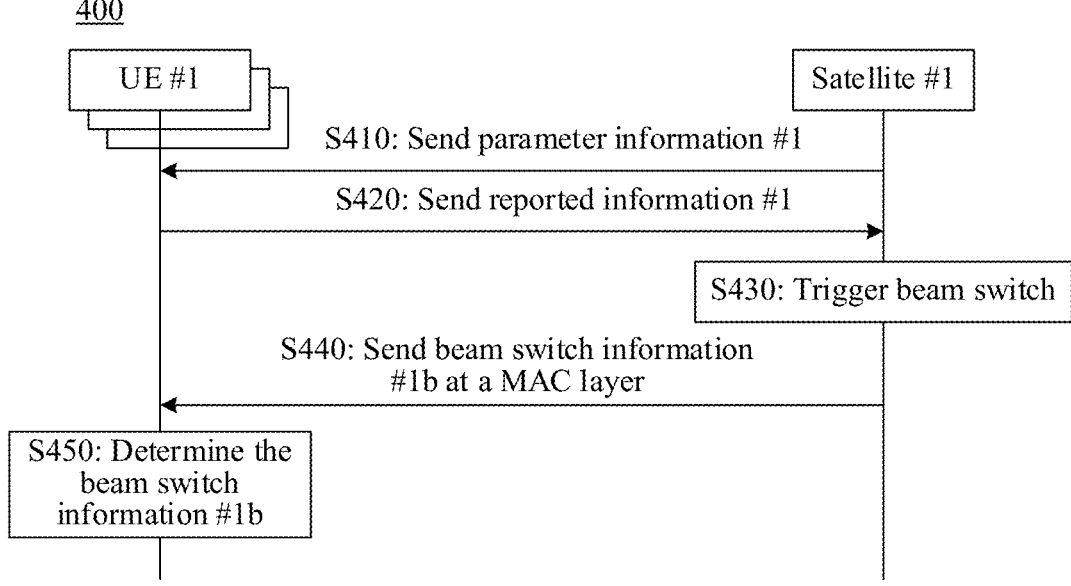
FIG. 6 is a schematic flowchart of another example of a satellite communication method according to an embodiment of this application.

In the method 200 and the method 300, the satellite may communicate the beam switch information at an RRC layer, or may send the beam switch information by using a media access control protocol data unit (MAC PDU). The following uses an example in which the satellite triggers beam switch based on UE grouping. FIG. 6 is a schematic flowchart of another example of a satellite communication method according to an embodiment of this application.

As shown in the method 400 in FIG. 6, details are as follows:

S410: A satellite #1 sends parameter information #1, and a plurality of UEs including UE #1 receive the parameter information #1.

For content of the parameter information #1, refer to descriptions in S210. Details are not described herein again.

S420: The plurality of UEs including the UE #1 send a plurality of instances of reported information to the satellite

1. The following uses reported information #1 sent by UE #1 as an example for description.

For content of the reported information #1, refer to descriptions in S220. Details are not described herein again.

S430: The satellite #1 triggers a beam switch.

The satellite #1 triggers the beam switch based on a grouping status of the plurality of UEs including the UE #1.

The following uses the UE #1 as an example for description. Because grouping of the UE #1 is based on a geographical location and/or a movement state of the UE #1, the satellite #1 triggers the beam switch based on the grouping status of the UE #1. This may also be understood as: The satellite #1 triggers the beam switch based on the geographical location and/or the movement state of a group to which the UE #1 belongs. For example, when a movement range of the satellite #1 needs to go beyond an area A, a group to which the UE #1 in the area A belongs needs to perform beam switching. Alternatively, when a movement state of a group to which the UE #1 belongs changes, beam switching needs to be performed. For example, it is determined, based on the movement state of the group to which the UE #1 belongs, that a beam range of the UE #1 changes after a specific period of time, and beam switch needs to be performed. Alternatively, when a geographical location of a group to which the UE #1 belongs changes, another beam range needs to be switched to. Specific steps are as follows:

Step a: The satellite #1 selects a logical channel identifier (LCID) that is not used currently, as an indication for the beam switch.

For example, currently, as shown in Table 4 according to a protocol (3 GPP 38.321), LCID values 33 to 46 are not used, and one value may be selected as the indication. For example, LCID=33 indicates the beam switch.

TABLE 4

| Index | LCID value |
|---|---|
| 0 | Common control channel (CCCH) |
| 1 to 32 | Logical channel identifier |
| 33 to 46 | Reserved |
| 47 | Recommended bit rate |
| . . . | . . . |
| 63 | Padding |

Step b: Use a MAC control element (MAC CE) to carry beam switch information #1b. For content of the beam switch information #1b, refer to the beam switch information #1 in the method 200. Details are not described herein again.

A MAC CE with a variable header may be used in one MAC PDU to carry the beam switch information #1b. For example, a beam switch parameter group in the beam switch information #1b includes a group identifier of a device group and a target beam ID (where a quantity of bits of different parameters may be determined based on a protocol design). A format of the beam switch information #1b is shown in Table 5.

TABLE 5

| R | F = 0<br>L (8 bits) | LCID = 33 |
|---|---|---|
| Group identifier (4 bits) | | Target beam ID (4 bits) |
| Group identifier (4 bits) | | Target beam ID (4 bits) |

In Table 5, R represents "empty". F indicates a quantity of bits of L. For example, if F=0, the quantity of bits of L is 8, or if F=1, the quantity of bits of L is 16. The LCID indicates beam switch. For example, LCID=33 represents that the MAC CE indicates the beam switch. L indicates a quantity of beam switch parameter groups. For example, when the quantity of bits of L is 8, L=00000001 indicates that the quantity of beam switch parameter groups is 1, and L=00000010 indicates that the quantity of beam switch parameter groups is 2 (for example, two beam switch parameter groups in a third row and a fourth row in Table 5).

It should be understood that quantities of bits of the foregoing different parameters are merely examples for description. This is not limited in this application.

S440: The satellite #1 sends the beam switch information #1b, and the plurality of UEs including the UE #1 receive the beam switch information #1b.

S450: The UE #1 is used as an example. The UE #1 determines the beam switch information #1b.

If the beam switch information #1b includes a group identifier of a device group to which the UE #1 belongs, the UE #1 performs beam switching. If the beam switch information #1b does not include a group identifier of a device group to which the UE #1 belongs, the UE #1 does not perform beam switching.

It should be noted that in the method 400, an example in which a satellite triggers the beam switch based on UE grouping (where a UE group is used as a granularity) is used to describe use of the MAC PDU for indicating the beam switch. Similarly, the beam switch may alternatively be triggered by using UE as a granularity, and the MAC PDU indicates the beam switch. In this way, an effect of improving beam switch accuracy can also be achieved. For a specific method, refer to the method 400. Details are not described herein again in this application.

Figure 7:
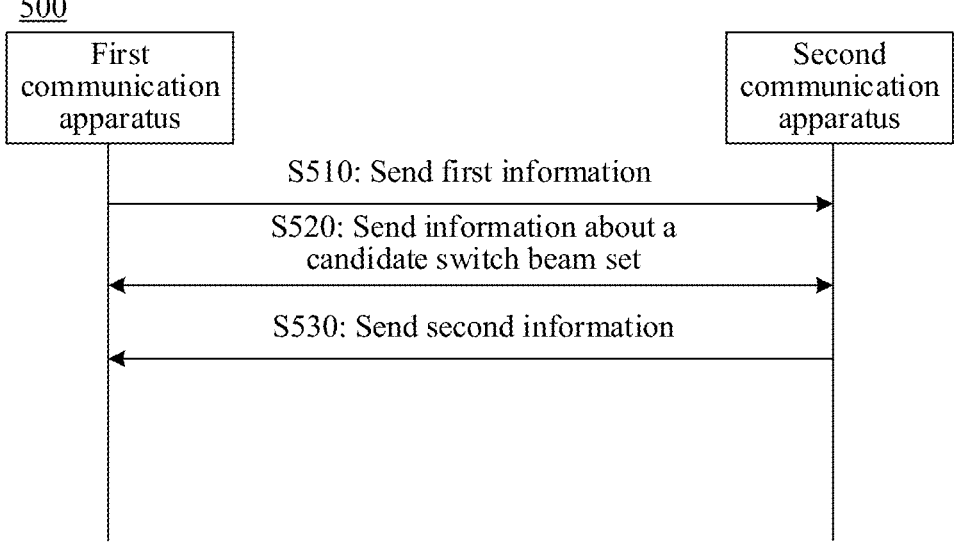
FIG. 7 is a schematic flowchart of another example of a satellite communication method according to an embodiment of this application.

In addition to the method in which the satellite indicates to the UE to perform beam switching, this application further provides a DCI-based beam switching method. More beam switching methods are indicated without increasing the DCI bit overhead. FIG. 7 is a schematic flowchart of another example of a satellite communication method according to an embodiment of this application.

As shown in the method 500 in FIG. 7, details are as follows:

S510: A first communication apparatus sends first information to a second communication apparatus, and the second communication apparatus receives the first information.

The first information may indicate a geographical location of the first communication apparatus.

In a possible implementation, the first information may further indicate a movement state of the first communication apparatus, where the movement state may include a movement speed and a movement direction.

S520: The second communication apparatus sends information about a candidate switch beam set, and the first communication apparatus receives the information about the candidate switch beam set.

The information about the candidate switch beam set is determined by the second communication apparatus based on the first information.

In this way, the candidate switch beam set may be a subset of one switch beam set. In this way, the candidate switch beam set may be indicated based on the first information, and second information indicates one first beam from the candidate switch beam set. In this way, one first beam is selected from a larger switch beam set without increasing the signaling overhead of the second information.

In a possible implementation, the information about the candidate switch beam set is carried in a first media access control control element (MAC CE).

S530: The second communication apparatus sends the second information, and the first communication apparatus receives the second information.

The second information indicates the first communication apparatus to switch to the first beam in the candidate switch beam set, where the first beam is one of the beams supported by the second communication apparatus.

In a possible implementation, the second information includes an identifier of the first beam or an index corresponding to the candidate switch beam set, and is included in first downlink control information DCI.

For example, the first DCI may be scrambled by using a cell-level or beam-level radio network temporary identifier (RNTI), or a frequency domain resource assignment field may be set to all 0s, representing that the first DCI indicates beam switch.

In this way, the first DCI is reused for indicating the communication apparatus to perform beam switching. For example, the first DCI may be a DCI that indicates to the first communication apparatus to change from an idle state to a connected state.

Figure 8:
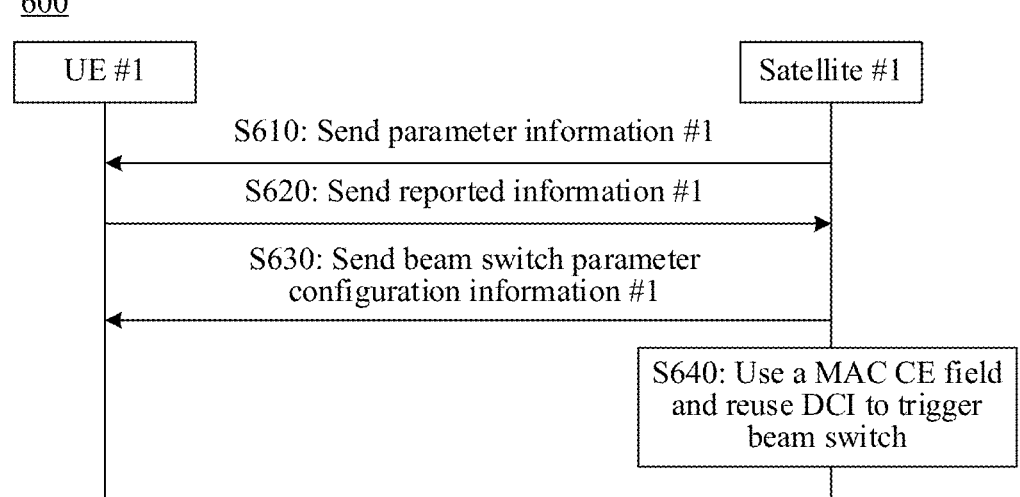
FIG. 8 is a schematic flowchart of another example of a satellite communication method according to an embodiment of this application.

The following describes the method 500 in detail by using an example in which the first communication apparatus is UE #1, and the second communication apparatus is a satellite #1. FIG. 8 is a schematic flowchart of another example of a satellite communication method according to an embodiment of this application. As shown in the method 600 in FIG. 8, details are as follows:

S610: A satellite #1 sends parameter information #1, and UE #1 receives the parameter information #1.

For content of the parameter information #1, refer to descriptions in S210. Details are not described herein again.

S620: The UE #1 sends reported information #1 to the satellite #1.

For content of the reported information #1, refer to descriptions in S220. Details are not described herein again.

S630: The satellite #1 sends beam switch parameter configuration information #1, and the UE #1 receives the beam switch parameter configuration information #1.

The beam switch parameter configuration information #1 includes a plurality of beam switch parameter groups. Each beam switch parameter group includes at least one of the following parameters:

a source beam ID: an ID of a beam on which the UE #1 is located before performing beam switching;

a target beam ID: an ID of a beam on which the UE #1 is located after performing beam switching; and switch time: time at which the UE #1 starts to perform beam switching.

For a manner of determining the target beam ID and the switch time, refer to content in the method 200. Details are not described herein again.

For example, an example format of the beam switch parameter configuration information #1 is as follows:

| | |
|---|---|
| Beam-switch-list ::= | SEQUENCE (SIZE (1..maxNumber)) OF Beam-switch-Info |
| Beam-switch-Info ::= | SEQUENCE { |
| Source-Beam ::= | Beam-ID |
| Target-Beam ::= | Beam-ID |
| Timer | ENUMERATED {2 ms, 3 ms, 4 ms, 20 ms, 30 ms, ... 1920 ms, 2560 ms, ...} |
| OPTIONAL, | |
| } | |

Beam-switch-list represents a beam switch list, that is, an index set of beam switch parameter groups.

maxNumber represents a maximum quantity of beam switch parameter groups.

Beam-switch-Info represents one beam switch parameter group. For descriptions of other parameters, refer to the beam switch information #1 in the method 200 or the beam switch information #1a in the method 300. Details are not described herein again.

In a possible implementation, the beam switch parameter configuration information #1 may be carried in UE-specific RRC signaling.

S640: The satellite #1 triggers a beam switch.

The satellite #1 triggers the beam switch based on a geographical location and/or a movement state of the UE #1. For example, when a movement range of the satellite #1 needs to go beyond an area A, the UE #1 in the area A needs to perform beam switching. Alternatively, when the movement state of the UE #1 changes, beam switching needs to be performed. For example, it is determined, based on the movement state of the UE #1, that a beam range of the UE #1 changes after a specific period of time, and beam switching needs to be performed. Alternatively, when the geographical location of the UE #1 changes, another beam range needs to be switched to. Specific steps are as follows:

Step a: The satellite #1 indicates, by setting a field in a MAC CE #1, a set of candidate switch beam parameter groups (which may also be referred to as a set of candidate switch beams) used by the UE #1 for performing beam switch.

For example, the satellite configures 8 instances of Beam-switch-Info (where there may alternatively be 4 instances of Beam-switch-Info, a quantity of Beam-switch-Info is not limited in this application, and each instance of Beam-switch-Info corresponds to one beam switch parameter group) for the UE #1 based on the beam switch parameter configuration information #1. The 8 instances of Beam-switch-Info correspond to 8 bits in the field in the MAC CE #1, as shown in Table 6.

is 2 bits. When the field in the MAC CE #1 indicates that the second, fourth, sixth, and eighth instances of Beam-switch-info serve as the set of candidate switch beam parameter groups, a value 00 of the field may correspond to the second instance of Beam-switch-info, a value 01 of the field may correspond to the fourth piece of Beam-switch-info, a value 10 of the field may correspond to the sixth instance of Beam-switch-info, and a value 11 of the field may correspond to the eighth instance of Beam-switch-info. The value 11 of the field indicates the UE #1 to perform beam switching based on a configuration of Beam-switch-info corresponding to switch 8. For another example, when the field in the MAC CE #1 indicates that the second and fourth instance of Beam-switch-info serve as the set of candidate switch beam parameter groups, only 1 bit in the field may be reused. A value 0 of the bit corresponds to the second instance of Beam-switch-info, and a value 1 of the bit corresponds to the fourth instance of Beam-switch-info. When the field in the MAC CE indicates one instance or three instances of Beam-switch-info to be activated, a method of reusing a field in the DCI is similar to the foregoing method. Details are not described herein again in this application.

Figure 9:
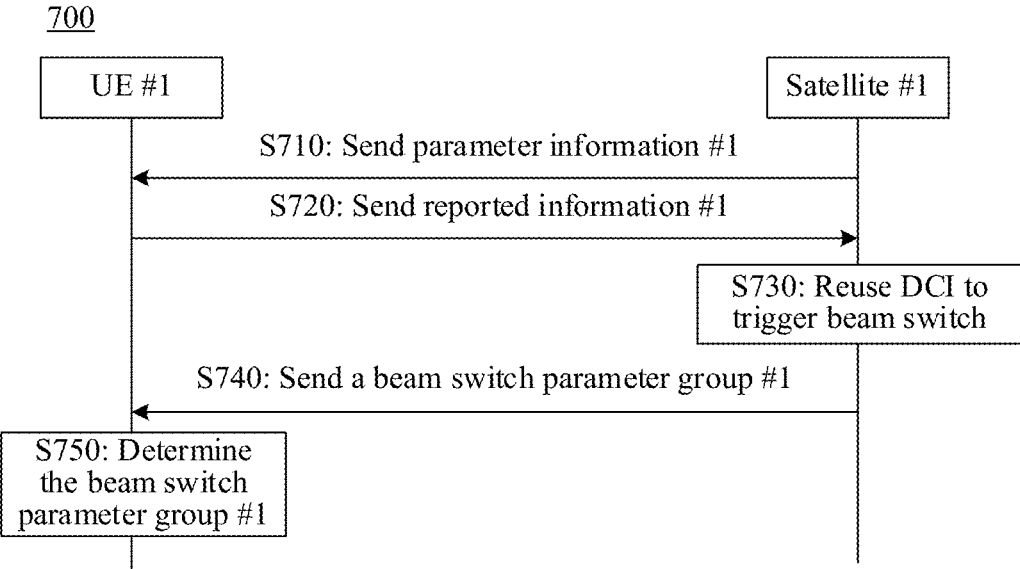
FIG. 9 is a schematic flowchart of another example of a satellite communication method according to an embodiment of this application.

The method 200, the method 300, the method 400, the method 500, and the method 600 are embodiments in which, when the UE is in the connected state, the satellite triggers the beam switch. This application further provides a manner in which a satellite triggers beam switching by reusing the DCI, when the UE is in an idle state, has no data to be scheduled, and needs to perform beam switching. FIG. 9 is a schematic flowchart of another example of a satellite communication method according to an embodiment of this application.

As shown in the method 700 in FIG. 9, details are as follows:

S710: A satellite #1 sends parameter information #1, and UE #1 receives the parameter information #1.

For content of the parameter information #1, refer to descriptions in S210. Details are not described herein again.

TABLE 6

| R | LCID = 33 | | | | | | |
|---|---|---|---|---|---|---|---|
| Switch 1 | Switch 2 | Switch 3 | Switch 4 | Switch 5 | Switch 6 | Switch 7 | Switch 8 |

In Table 6, R represents "empty", and an LCD value being 33 indicates that the MAC CE indicates the beam switch. Switch 1 to switch 8 correspond to the 8 instances of Beam-switch-info. This may also be understood as: 8 beam switch parameter groups correspond to 8 bits. A value of a bit being 0 may represent that a beam switch method corresponding to the bit is not activated. A value of a bit being 1 may represent that a beam switch method corresponding to the bit is activated. For example, the field in the MAC CE #1 being 01010101 represents that second, fourth, sixth, and eighth instances of Beam-switch-info corresponding to the field are activated. The second, fourth, sixth, and eighth instances of Beam-switch-info corresponding to the field serve as the set of candidate switch beam parameter groups.

Step b: The satellite #1 reuses the DCI, indicating to select one beam switch parameter group from the set of candidate switch beam parameter groups for the UE #1 to perform beam switching.

For example, the satellite #1 may reuse a bandwidth part indicator field in DCI #1, and a maximum length of the field

S720: The UE #1 sends reported information #1 to the satellite #1.

For content of the reported information #1, refer to descriptions in S220. Details are not described herein again.

S730: The satellite #1 triggers a beam switch.

The satellite #1 determines, based on a geographical location and/or a movement state of the UE #1, an occasion for triggering the UE #1 to perform beam switching. For example, when a movement range of the satellite #1 needs to go beyond an area A, the UE #1 in the area A needs to perform beam switching. Alternatively, when the movement state of the UE #1 changes, beam switching needs to be performed. For example, it is determined, based on the movement state of the UE #1, that a beam range of the UE #1 changes after a specific period of time, and beam switching needs to be performed. Alternatively, when the geographical location of the UE #1 changes, another beam range needs to be switched to. The following uses the UE #1 as an example for description. Specific steps are as follows:

Step a: Determine a beam switch parameter group #1.

For the content of the beam switch parameter group #1, refer to descriptions of the beam switch parameter group in the method 300 or the method 600. Details are not described herein again.

Step b: Reuse a field in DCI #1 for waking up the UE #1 to send the beam switch parameter group #1.

For example, a frequency domain resource assignment field in the DCI #1 may be set to all 0s, representing that the DCI #1 indicates the beam switch. In this case, a remaining field in the DCI #1 is interpreted in the following ways.

Method 1

5 bits indicate a target beam ID, and remaining 22 bits are reserved.

Method 2

5 bits indicate a target beam ID, and 5 bits indicate a time offset. The time offset is an offset between a moment at which the UE #1 receives the DCI #1 and a moment at which the UE #1 starts to perform beam switching. A unit may be a slot, an SFN, a millisecond, or the like. The remaining 17 bits are reserved.

Method 3

5 bits indicate an index (for example, the index of the Beam-switch-info in the beam switch parameter configuration information in the method 530) corresponding to a beam switch parameter group. The remaining 22 bits are reserved.

Method 4

5 bits indicate an index (for example, the index of Beam-switch-info in the beam switch parameter configuration information in the method 530) corresponding to a beam switch parameter group, and 5 bits indicate a time offset. The time offset may be an offset between a moment at which the UE #1 receives the DCI #1 and a moment at which the UE #1 starts to perform beam switching. A unit may be a slot, an SFN, a millisecond, or the like. The remaining 17 bits are reserved.

Optionally, for the DCI #1, refer to the bandwidth part indicator field reused in the DCI #1 in step b in S640, to indicate to select one beam switch parameter group from a set of candidate switch beam parameter groups for the UE #1 to perform beam switching. For a specific manner, refer to the method 600. Details are not described again in this application.

Step c: Scramble the DCI #1 by using a cell radio network temporary identifier (C-RNTI).

S740: The satellite #1 sends the DCI #1, and the UE #1 receives the DCI #1.

S750: When detecting the DCI #1 that is scrambled by using the C-RNTI and whose frequency domain resource assignment field is all 0s, the UE #1 interprets the DCI #1 based on one of the method 1, the method 2, the method 3, and the method 4, determines the beam switch parameter group #1, and performs beam switching based on the beam switch parameter group #1.

Figure 10:
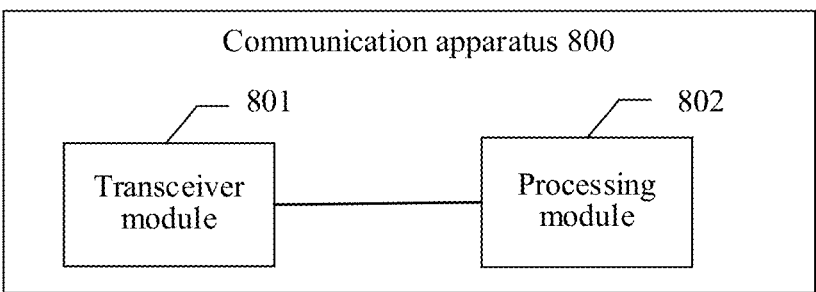
FIG. 10 is an exemplary schematic diagram of a structure of a communication apparatus according to an embodiment of this application.
Figure 11:
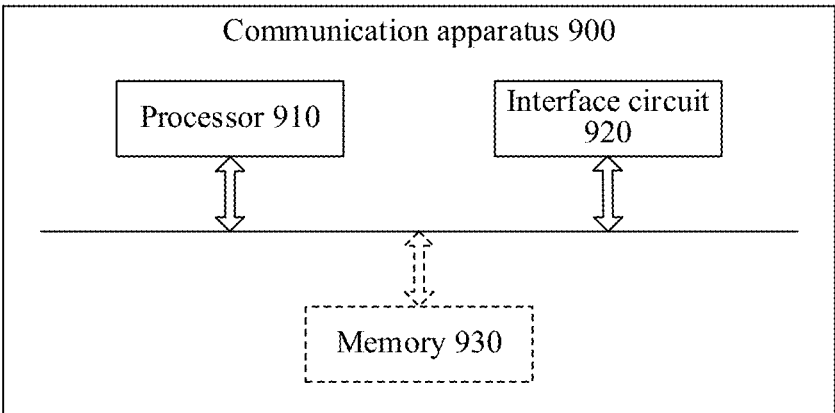
FIG. 11 is an exemplary schematic diagram of another example of a structure of a communication apparatus according to an embodiment of this application.

FIG. 10 and FIG. 11 are possible schematic diagrams of structures of communication apparatuses according to embodiments of this application. These communication apparatuses can implement a function of the terminal device or the satellite (which may also be referred to as the network device) in the foregoing method embodiments, and therefore can also achieve beneficial effects of the foregoing method embodiments. In the embodiments of this application, the communication apparatuses may be the first communication apparatus in the method 100, may be the second communication apparatus in the method 100, or may be a module (such as a chip) used in a first communication apparatus or a second communication apparatus.

As shown in FIG. 10, a communication apparatus 800 includes a transceiver module 801 and a processing module 802. The communication apparatus 800 may be configured to implement a function of the first communication apparatus or the second communication apparatus in the method embodiment shown in FIG. 3.

When the communication apparatus 800 is configured to implement the function of the first communication apparatus in the method embodiment shown in FIG. 3, the transceiver module 801 is configured to send first information, where the first information indicates a geographical location of the first communication apparatus. The transceiver module 801 is further configured to receive second information, where the second information indicates that the first communication apparatus belongs to a first device group, the first device group corresponds to the geographical location of the first communication apparatus, and the second information includes a group identifier of the first device group. The transceiver module 801 is further configured to receive third information, where the third information includes a group identifier of a second device group and an identifier of a first beam, and the third information indicates a communication apparatus in a device group indicated by the group identifier of the second device group to switch to the first beam. The processing module 802 is configured to: if the group identifier of the first device group is the same as the group identifier of the second device group, switch to the first beam.

When the communication apparatus 800 is configured to implement the function of the second communication apparatus in the method embodiment shown in FIG. 3, the transceiver module 801 is configured to receive a plurality of instances of first information, where the plurality of instances of first information are in one-to-one correspondence with a plurality of first communication apparatuses, and each instance of first information includes geographical location information of a corresponding first communication apparatus. The transceiver module 801 is further configured to send a group identifier of a first device group to which a first communication apparatus belongs, where the first communication apparatus is one of the plurality of communication apparatuses, and the first device group belongs to one of at least one device group determined by the processing module 802 by grouping, based on the plurality of instances of first information, the plurality of communication apparatuses. The transceiver module 801 is further configured to send second information, where the second information includes the group identifier of the first device group, and the second information indicates a communication apparatus in the first device group to perform beam switching, to switch to a first beam.

When the communication apparatus 800 is configured to implement a function of the first communication apparatus (for example, the terminal device) in the method embodiment in FIG. 7, the transceiver module 801 is configured to send first information, where the first information includes geographical location information of the first communication apparatus, and the first information is used by a second communication apparatus to determine information about a candidate switch beam set of first UEs. The transceiver module 801 is further configured to receive the information about the candidate switch beam set. The transceiver module 801 is further configured to receive second information, where the second information indicates the first communication apparatus to switch to a first beam in the candidate switch beam set, and the first beam is one of the beams supported by the second communication apparatus. The processing module 802 is configured to perform beam switching based on the second information, to switch to the first beam.

When the communication apparatus 800 is configured to implement a function of the second communication apparatus (for example, the satellite) in the method embodiment in FIG. 7, the transceiver module 801 is configured to receive first information, where the first information includes geographical location information of a first communication apparatus. The transceiver module 801 is further configured to send information about a candidate switch beam set, where the information about the candidate switch beam set is determined based on the first information. The transceiver module 801 is further configured to send second information, where the second information indicates the first communication apparatus to switch to a first beam in the candidate switch beam set, and the first beam is one of the beams supported by the second communication apparatus. The processing module 802 is configured to determine the information about the candidate switch beam set based on the first information.

For more detailed descriptions of the transceiver module 801 and the processing module 802, refer to related descriptions in the foregoing method embodiments. Details are not described herein again.

As shown in FIG. 11, a communication apparatus 900 includes a processor 910 and an interface circuit 920. The processor 910 and the interface circuit 920 are coupled to each other. It may be understood that the interface circuit 920 may be a transceiver or an input/output interface. Optionally, the communication apparatus 900 may further include a memory 930, configured to store instructions executed by the processor 910, or store input data for the processor 910 to run instructions, or store data generated after the processor 910 runs instructions.

For example, the memory 930 and the processor 910 may be integrated together, or may be independent components.

When the communication apparatus 900 is configured to implement the method in the foregoing method embodiments, the processor 910 is configured to perform functions of the processing module 802, and the interface circuit 920 is configured to perform functions of the transceiver module 801.

When the foregoing communication apparatus is a chip used in a first communication apparatus (for example, a terminal device), the chip in the first communication apparatus implements a function of the first communication apparatus in the foregoing method embodiments. The chip in the first communication apparatus receives information from another module (for example, a radio frequency module or an antenna) in the first communication apparatus, where the information is sent by a second communication apparatus (for example, a satellite) to the first communication apparatus. Alternatively, the chip in the first communication apparatus sends information to another module (for example, a radio frequency module or an antenna) in the first communication apparatus, where the information is sent by the first communication apparatus to a second communication apparatus.

When the foregoing communication apparatus is a chip used in a second communication apparatus (which may also be referred to as a network device), the chip in the second communication apparatus implements a function of the second communication apparatus in the foregoing method embodiments. The chip in the second communication apparatus receives information from another module (for example, a radio frequency module or an antenna) in the second communication apparatus, where the information is sent by a first communication apparatus (for example, a satellite) to the second communication apparatus. Alternatively, the chip in the second communication apparatus sends information to another module (for example, a radio frequency module or an antenna) in the second communication apparatus, where the information is sent by the second communication apparatus to a first communication apparatus.

It may be understood that the processor in this embodiment of this application may be a central processing unit (CPU), or may be another general-purpose processor, a digital signal processor (DSP), an application-specific integrated circuit (ASIC), a field programmable gate array (FPGA) or another programmable logic device, a transistor logic device, a hardware component, or any combination thereof. The general-purpose processor may be a microprocessor, or may be any regular processor.

Method steps in embodiments of this application may be implemented in hardware, or may be implemented by executing software instructions by the processor. The software instructions may include a corresponding software module. A software module may be stored in a random access memory (RAM), a flash memory, a read-only memory (ROM), a programmable read-only memory (PROM), an erasable programmable read-only memory (EPROM), an electrically erasable programmable read-only memory (EEPROM), a register, a hard disk drive, a removable hard disk drive, a CD-ROM, or any other form of storage medium well-known in the art. For example, a storage medium is coupled to a processor, to enable the processor to read information from the storage medium and write information into the storage medium. Certainly, the storage medium may be a component of the processor. The processor and the storage medium may be disposed in the ASIC. In addition, the ASIC may be disposed in an access network device or a terminal device. Certainly, the processor and the storage medium may exist, as discrete components, in the access network device or the terminal device.

All or a part of the foregoing embodiments may be implemented by using software, hardware, firmware, or any combination thereof. When the software is used to implement the embodiments, all or a part of the embodiments may be implemented in a form of a computer program product. The computer program product includes one or more computer programs or instructions. When the one or more computer programs or the instructions is/are loaded and executed on a computer, all or a part of the procedures or functions in embodiments of this application are performed. The computer may be a general-purpose computer, a special-purpose computer, a computer network, or another programmable apparatus. The one or more computer programs or the instructions may be stored in a computer-readable storage medium, or may be communicated by using the computer-readable storage medium. The computer-readable storage medium may be any usable medium accessible by the computer, or a data storage device such as a server integrating one or more usable media. The usable medium may be a magnetic medium, for example, a floppy disk, a hard disk drive, or a magnetic tape, may be an optical medium, for example, a DVD, or may be a semiconductor medium, for example, a solid state drive (SSD).

In embodiments of this application, unless otherwise stated or there is a logic conflict, terms and/or descriptions between different embodiments are consistent and may be mutually referenced, and technical features in different embodiments may be combined into a new embodiment based on an internal logical relationship thereof.

In this application, "at least one" means one or more, and "a plurality of" means two or more. "And/or" describes an association relationship between associated objects, and represents that three relationships may exist. For example, A and/or B may represent the following cases: Only A exists, both A and B exist, and only B exists, where A and B may be singular or plural. In the text descriptions of this application, the character "/" usually represents an "or" relationship between the associated objects. In a formula in this application, the character "/" represents a "division" relationship between the associated objects.

It may be understood that various numbers in embodiments of this application are merely used for differentiation for ease of description, and are not used to limit the scope of embodiments of this application. Sequence numbers of the foregoing processes do not mean execution sequences, and the execution sequences of the processes should be determined based on functions and internal logic of the processes. It should be noted that not all steps in embodiments of this application need to be performed. A part of the steps may be omitted, and a similar effect can also be achieved.

What is claimed is:

1. A satellite communication method comprising:
sending, by a first communication apparatus, first information indicating a geographical location of the first communication apparatus;
receiving, by the first communication apparatus, second information indicating that the first communication apparatus belongs to a first device group corresponding to the geographical location of the first communication apparatus, and the second information comprises a group identifier of the first device group;
receiving, by the first communication apparatus, third information comprising a group identifier of a second device group and an identifier of a first beam, the third information indicating a communication apparatus in a device group indicated by the group identifier of the second device group to switch to the first beam; and
switching, by the first communication apparatus, to the first beam if the group identifier of the first device group is the same as the group identifier of the second device group.

2. The method according to claim 1, wherein receiving, by the first communication apparatus, the third information comprises:
receiving, by the first communication apparatus, the third information on a first resource, wherein the first resource is indicated by fourth information, and a resource occupied for transmission of the fourth information is determined by using at least one of semi-static allocation, or a calculation based on the group identifier of the first device group.

3. The method according to claim 2, wherein the third information further comprises at least one of the following parameters:
a time at which the communication apparatus in the second device group starts to perform beam switching and a first time offset, wherein the first time offset is an interval between a time at which the communication apparatus in the second device group receives fifth information and a time at which the communication apparatus in the second device group receives the fourth information, and the fifth information is updated information of the fourth information.

4. The method according to claim 3, wherein the fourth information and the fifth information are scrambled by using a cell-level or a beam-level radio network temporary identifier (RNTI).

5. The method according to claim 1, wherein the third information is comprised in downlink control information (DCI).

6. The method according to claim 1, wherein the third information is carried on a first media access control control element (MAC CE), and a type of the third information is indicated by a logical channel identifier (LCD) value in a first MAC protocol data unit (PDU).

7. The method according to claim 1, wherein the first information further indicates a movement state of the first communication apparatus.

8. The method according to claim 1, wherein the method further comprises:
not performing beam switching by the first communication apparatus if the group identifier of the first device group is different from the group identifier of the second device group.

9. A satellite communication method, wherein the method comprises:
receiving a plurality of instances of first information in a one-to-one correspondence with a plurality of communication apparatuses, and each instance of first information indicates a geographical location of a corresponding communication apparatus;
sending a group identifier of a first device group to which a first communication apparatus belongs, wherein the first communication apparatus is one of the plurality of communication apparatuses, and the first device group belongs to one of at least one device group determined by grouping the plurality of communication apparatuses based on the plurality of instances of first information; and
sending second information comprising the group identifier of the first device group, the second information indicating a communication apparatus in the first device group to perform beam switching, to switch to a first beam.

10. The method according to claim 9, wherein the second information further comprises information about the first beam.

11. The method according to claim 9, wherein sending the second information comprises:
sending the second information on a first resource, wherein the first resource is indicated by third information, and a resource occupied for transmission of the third information is determined by using at least one of semi-static allocation, or a calculation based on the group identifier of the first device group.

12. The method according to claim 11, wherein the second information further comprises at least one of the following parameters:
a time at which the communication apparatus in the first device group starts to perform beam switching and a first time offset, wherein the first time offset is an interval between a time at which the communication apparatus in the first device group receives fourth information and a time at which the communication apparatus in the first device group receives the third information, and the fourth information is updated information of the third information.

13. The method according to claim 12, wherein the third information and the fourth information are scrambled by using a cell-level or beam-level radio network temporary identifier (RNTI).

14. The method according to claim 9, wherein the second information is comprised in downlink control information (DCI).

15. The method according to claim 9, wherein the second information comprises a first list comprising the group identifier of the first device group and a group identifier of a second device group.

16. The method according to claim 9, wherein the second information is carried on a first media access control control element (MAC CE), and a type of the second information is indicated by a logical channel identifier (LCD) value in a first MAC protocol data unit (PDU).

17. The method according to claim 9, wherein each instance of first information further indicates a movement state of the corresponding communication apparatus.

18. A communication apparatus, comprising:

at least one processor; and at least one non-transitory memory comprising computer program code, wherein the processor is configured to execute the computer program code to enable the communication apparatus to:

send first information indicating a geographical location of a first communication apparatus;

receive second information indicating that the first communication apparatus belongs to a first device group corresponding to the geographical location of the first communication apparatus, and the second information comprises a group identifier of the first device group;

receive third information comprising a group identifier of a second device group and an identifier of a first beam, the third information indicating a communication apparatus in a device group indicated by the group identifier of the second device group to switch to the first beam; and switch to the first beam if the group identifier of the first device group is the same as the group identifier of the second device group.

19. The communication apparatus according to claim 18, wherein the processor is further configured to execute the computer program code to further enable the communication apparatus to receive the third information on a first resource, wherein the first resource is indicated by fourth information, and a resource occupied for transmission of the fourth information is determined by using on at least one of semi-static allocation, or a calculation based on the group identifier of the first device group.

20. The communication apparatus according to claim 19, wherein the third information further comprises at least one of:

a time at which the communication apparatus in the second device group starts to perform beam switching and a first time offset, wherein the first time offset is an interval between a time at which the communication apparatus in the second device group receives fifth information and a time at which the communication apparatus in the second device group receives the fourth information, and the fifth information is updated information of the fourth information.

* * * * *